US012717070B2

(12) United States Patent
Kenney et al.

(10) Patent No.: US 12,717,070 B2
(45) Date of Patent: Aug. 25, 2026

(54) LIGHT CONTROL FILM AND METHOD OF MAKING THEREOF

(71) Applicant: 3M INNOVATIVE PROPERTIES COMPANY, St. Paul, MN (US)

(72) Inventors: Raymond J. Kenney, Woodbury, MN (US); Tao Liu, Woodbury, MN (US); Kevin W. Gotrik, Hudson, WI (US); Caleb T. Nelson, McKinney, TX (US); Nicholas A. Johnson, Burnsville, MN (US); Daniel J. Schmidt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 589 days.

(21) Appl. No.: 18/246,419

(22) PCT Filed: Oct. 18, 2021

(86) PCT No.: PCT/IB2021/059575
§ 371 (c)(1),
(2) Date: Mar. 23, 2023

(87) PCT Pub. No.: WO2022/084827
PCT Pub. Date: Apr. 28, 2022

(65) Prior Publication Data

US 2023/0393312 A1 Dec. 7, 2023

Related U.S. Application Data

(60) Provisional application No. 63/094,681, filed on Oct. 21, 2020.

(51) Int. Cl.
*G02B 5/00* (2006.01)
*G02F 1/1335* (2006.01)

(52) U.S. Cl.
CPC ....... *G02B 5/003* (2013.01); *G02F 1/133524* (2013.01); *G02B 2207/123* (2013.01)

(58) Field of Classification Search
CPC .............. G02B 5/003; G02B 2207/123; G02F 1/133524; G09F 21/049; G09F 19/14
See application file for complete search history.

(56) References Cited

U.S. PATENT DOCUMENTS 3,524,789 A 8/1970 Olsen
6,398,370 B1 6/2002 Chiu et al.
(Continued)

FOREIGN PATENT DOCUMENTS

WO WO-2009085581 A1 * 7/2009 ............ G02B 5/045
WO 2019118589 A1 6/2019
WO 2020026139 A1 2/2020

OTHER PUBLICATIONS

International Search Report received for PCT International Application No. PCT/IB2021/059575, mailed on Feb. 17, 2022, 4 pages.

*Primary Examiner* — Marin Pichler
(74) *Attorney, Agent, or Firm* — Jonathan L. Tolstedt

(57) ABSTRACT

A light control film comprising a light input surface and a light output surface opposite the light input surface; alternating transmissive regions and absorptive regions disposed between the light input surface and the light output surface, wherein each absorptive region has an aspect ratio of at least 30, and wherein each transmissive region has a first refractive index; and a plurality of low index layers, wherein each low index layer is disposed between each transmissive region and an adjacent absorptive region, and wherein each low index layer has a second refractive index less than the first refractive index of each transmissive region.

19 Claims, 20 Drawing Sheets

(56) References Cited

U.S. PATENT DOCUMENTS

| | | | | |
|---|---|---|---|---|
| 7,467,873 | B2 | 12/2008 | Clarke et al. | |
| 7,985,466 | B2 | 7/2011 | Saitoh | |
| 8,012,567 | B2 | 9/2011 | Gaides et al. | |
| 8,460,568 | B2 | 6/2013 | David et al. | |
| 8,503,122 | B2 | 8/2013 | Liu et al. | |
| 8,658,248 | B2 | 2/2014 | Anderson et al. | |
| 9,335,449 | B2 | 5/2016 | Gaides et al. | |
| 9,791,709 | B1 | 10/2017 | Ouderkirk et al. | |
| 2007/0160811 | A1 * | 7/2007 | Gaides .................. | G02B 5/003<br>428/173 |
| 2008/0186558 | A1 | 8/2008 | Lee et al. | |
| 2010/0316852 | A1 | 12/2010 | Condo et al. | |
| 2015/0276988 | A1 | 10/2015 | Cok | |
| 2020/0400865 | A1 | 12/2020 | Schmidt et al. | |
| 2021/0333624 | A1 * | 10/2021 | Schmidt ................ | G02B 5/305 |
| 2023/0028958 | A1 | 1/2023 | Liu et al. | |
| 2023/0109003 | A1 | 4/2023 | Schmidt et al. | |

* cited by examiner

1400

Y-AXIS

Refractive Index 1.48
1.46
1.44
1.42
1.40
1.38
1.36
1.34
1.32
1.30

0 50 100 150 200 250 300 350 400 450 500 550 600 650 700 750 800 850 900 950

Thickness

X-AXIS 0.9-1.0
0.8-0.9
0.7-0.8
0.6-0.7
0.5-0.6
0.4-0.5
0.3-0.4

1500

1.8-2.0
1.6-1.8
1.4-1.6
1.2-1.4
1.0-1.2
0.8-1.0
0.6-0.8
0.4-0.6
0.2-0.4
0.0-0.2

Y-AXIS
Refractive Index
1.48 1.46 1.44 1.42 1.40 1.38 1.36 1.34 1.32 1.30

X-AXIS
Thickness
0 50 100 150 200 250 300 350 400 450 500 550 600 650 700 750 800 850 900 950

1900

1902: PROVIDE MICROSTRUCTURED FILM COMPRISING PLURALITY OF LIGHT TRANSMISSIVE REGIONS ALTERNATED WITH CHANNELS, WHEREIN MICROSTRUCTURED FILM HAS SURFACE DEFINED BY TOP SURFACE AND SIDE WALLS OF EACH LIGHT TRANSMISSIVE REGION AND BOTTOM SURFACE OF EACH CHANNEL, AND WHEREIN MICROSTRUCTURED FILM HAS FIRST REFRACTIVE INDEX

1904: APPLY LAYER OF LOW REFRACTIVE INDEX MATERIAL TO SURFACE

1906: APPLY LAYER OF LIGHT ABSORPTIVE MATERIAL ON LAYER OF LOW REFRACTIVE INDEX MATERIAL, WHEREIN LOW REFRACTIVE INDEX MATERIAL HAS SECOND REFRACTIVE INDEX LESS THAN FIRST REFRACTIVE INDEX OF MICROSTRUCTURED FILM

1908: REMOVE AT LEAST PORTION OF LAYER OF LOW REFRACTIVE INDEX MATERIAL AND LAYER OF LIGHT ABSORPTIVE MATERIAL FROM TOP SURFACE OF EACH LIGHT TRANSMISSIVE REGION AND BOTTOM SURFACE OF EACH CHANNEL; WHEREIN THE LAYER OF THE LIGHT ABSORPTIVE MATERIAL HAS AN ASPECT RATIO OF AT LEAST 30

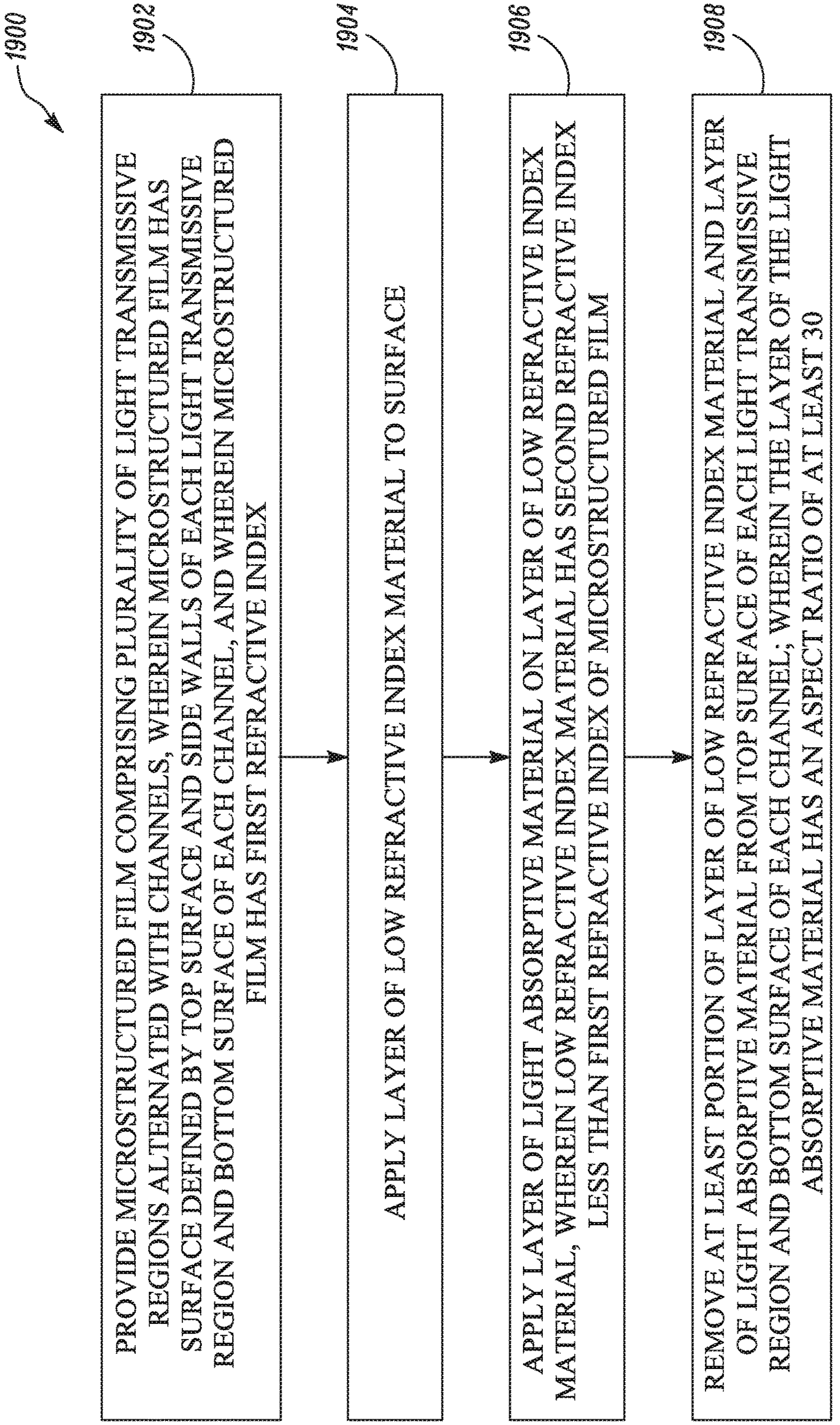

FIG. 19

LIGHT CONTROL FILM AND METHOD OF MAKING THEREOF

CROSS REFERENCE TO RELATED APPLICATIONS

This application is a national stage filing under 35 U.S.C. 371 of PCT/IB2021/059575, filed Oct. 18, 2021, which claims the benefit of U.S. Provisional Patent Application No. 63/094,681, filed Oct. 21, 2020, the disclosure of which is incorporated by reference in its/their entirety herein.

TECHNICAL FIELD

The present disclosure relates to light control films, and more specifically to light control films for use in various optical applications and methods of making such light control films.

BACKGROUND

A Light Control Film (LCF) is designed to regulate a directionality of transmitted light. Various LCFs are known, and typically include a light transmissive film having a plurality of louvers. LCF can be used in various applications, such as privacy filters as well as in automotive display applications. Currently, LCFs are manufactured using skiving processes, extrusion replication processes, or cast-and-cure processes. Further, in some cases, it is desirable to tune an on-axis light transmission through the LCF based on application requirements. The on-axis light transmission of the LCFs that are currently available in the markets is limited because of louver aspect ratios. Currently, it is a challenge to broaden a viewing angle at which high on-axis transmission can be achieved while maintaining off-axis light cut-off. Thus, it may be desirable to manufacture LCFs that exhibits high on-axis light transmission through a broader view angle

SUMMARY

Generally, the present disclosure relates to light control films. The present disclosure also relates to light control films for use in optical applications and methods of making such light control films. In view of the forgoing, we recognize there is a need in the art for light control films with higher aspect ratio louvers that can allow improved on-axis light transmission. In certain applications, such as automotive displays, it is desirable to have a wider angular output of the high transmission region of light without sacrificing cutoff angle. We have discovered that applying low index layers on each side of a high extinction coefficient core/absorptive region provides total internal reflection which in turn provides a broader light output distribution.

Briefly, in one aspect we have discovered a light control film comprising a light input surface and a light output surface opposite the light input surface; alternating transmissive regions and absorptive regions disposed between the light input surface and the light output surface, wherein each absorptive region has an aspect ratio of at least 30, and wherein each transmissive region has a first refractive index; and a plurality of low index layers, wherein each low index layer is disposed between each transmissive region and an adjacent absorptive region, and wherein each low index layer has a second refractive index less than the first refractive index of each transmissive region.

In another aspect, we have discovered a method of making a light control film comprising (a) providing a microstructured film comprising a plurality of light transmissive regions alternated with channels, wherein the microstructured film has a surface defined by a top surface and side walls of each light transmissive region and a bottom surface of each channel, and wherein the microstructured film has a first refractive index; (b) applying a layer of a low refractive index material to the surface, wherein the low refractive index material has a second refractive index less than the first refractive index of the microstructured film; (c) applying a layer of a light absorptive material on the layer of the low refractive index material; and (d) removing at least a portion of the layer of the low refractive index material and the layer of the light absorptive material from the top surface of each light transmissive region and the bottom surface of each channel; wherein the layer of the light absorptive material has an aspect ratio of at least 30.

In yet another aspect, we have discovered a light control film comprising a light input surface and a light output surface opposite the light input surface; alternating transmissive regions and absorptive regions disposed between the light input surface and the light output surface, wherein each absorptive region has an aspect ratio of at least 30, wherein each transmissive region has a first refractive index; a plurality of low index layers, wherein each low index layer is disposed between each transmissive region and an adjacent absorptive region, and wherein each low index layer has a second refractive index less than the first refractive index of each transmissive region; and a plurality of intermediate index layers, wherein each intermediate index layer is disposed between each low index layer and an adjacent absorptive region, wherein each intermediate index layer has a fourth refractive index greater than the second refractive index of each low index layer.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

FIG. 19 is a flowchart for a method of making the light control film according to an embodiment of the present disclosure.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the context of present disclosure, the terms “first” and “second” are used as identifiers. Therefore, such terms should not be construed as limiting of this disclosure. The terms “first” and “second” when used in conjunction with a feature or an element can be interchanged throughout the embodiments of this disclosure.

The present disclosure relates to a light control film that may provide total internal reflection. The light control film may be used in various applications, such as privacy filters, automotive displays, and so forth. In an example, the light control film includes a base film, a number of low index coating layers, absorptive regions, and transmissive regions. In another example, the light control film includes a base film, a number of low index coating layers, a number of intermediate index coating layers, absorptive regions, and transmissive regions. The light control film may provide a high on-axis transmission through a broad view angle. More specifically, the light control film described herein may allow broadening of a viewing angle at which high on-axis transmission may be achieved while maintaining off-axis light cut-off. Further, the present disclosure also relates to a method of making the light control film.

Figure 1:
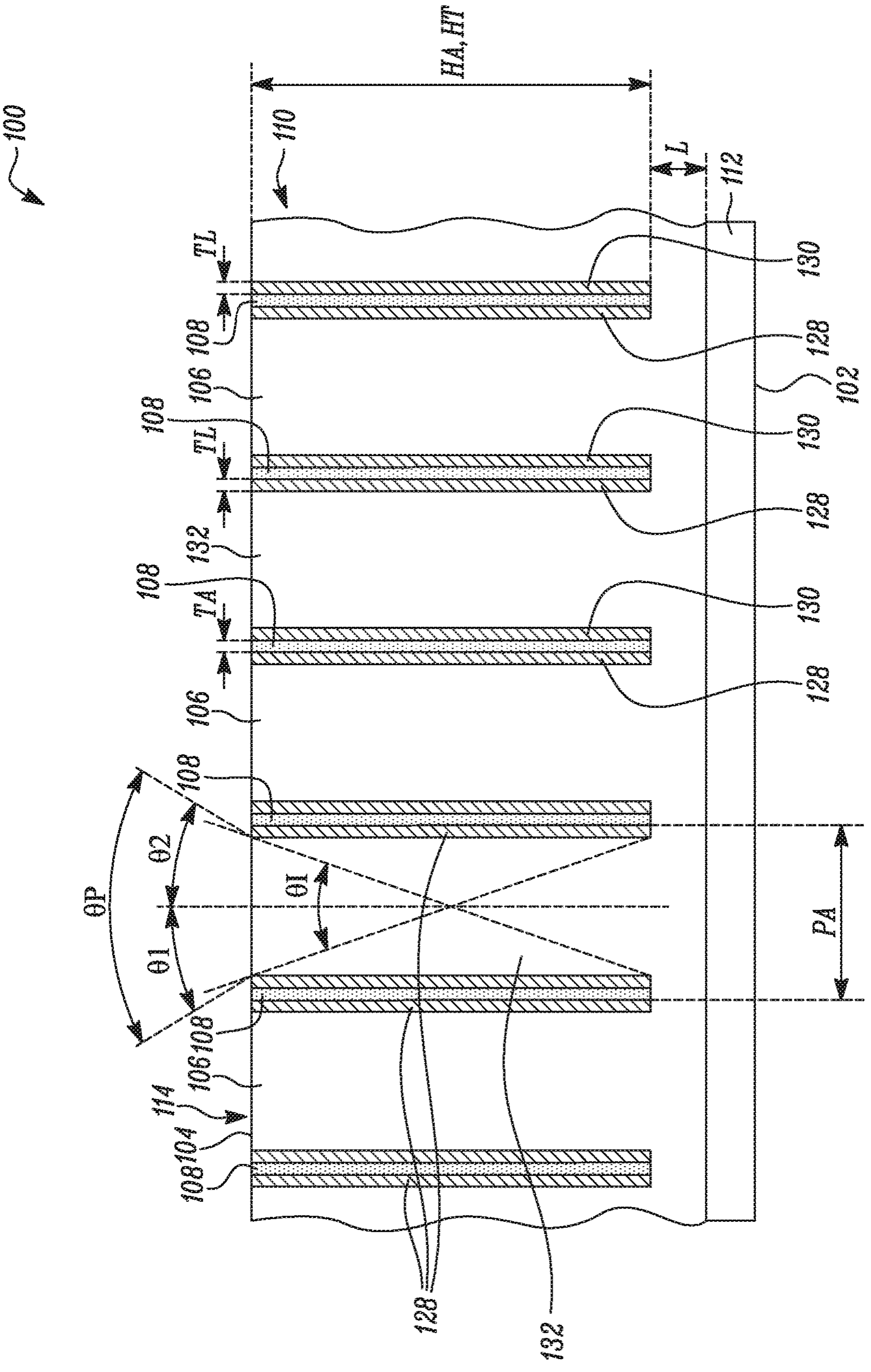
FIG. 1 is a side view of a light control film according to an embodiment of the present disclosure.

FIG. 1 shows a perspective view of an exemplary light control film 100. The light control film 100 is hereinafter interchangeably referred to as “LCF 100”. The LCF 100 is embodied as a high aspect ratio film. The LCF 100 includes a light input surface 102 and a light output surface 104 opposite to the light input surface 102. The light output surface 104 is typically parallel the light input surface 102. The LCF 100 includes alternating transmissive regions 106 and absorptive regions 108 disposed between the light input surface 102 and the light output surface 104. Each absorptive region 108 has an aspect ratio of at least 30. Further, each transmissive region 106 has a first refractive index. The transmissive regions 106 may be hereinafter interchangeably referred to as “light transmissive regions 106”. Further, the absorptive regions 108 may be hereinafter interchangeably referred to as “light absorptive regions 108”.

Further, the LCF 100 includes a base film 110. The base film 110 may be formed by micro-replication. The base film 110 may be hereinafter interchangeably referred to as the microstructured film 110. The base film 110 includes a base layer 112 and a louver structure 114. In an example, the base layer 112 may be made of polyethylene terephthalate (PET) or polycarbonate (PC). Examples of useful PET films include photograde polyethylene terephthalate, available from DuPont Films of Wilmington, Del. under the trade designation “Melinex 618”. Examples of optical grade polycarbonate films include LEXAN® polycarbonate film 8010, available from GE Polymershapes, Seattle Wash., and Panlite 1151, available from Teijin Kasei, Alpharetta Ga.

Useful materials for the base layer 112 may further include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base layer 112 can contain mixtures or combinations of these materials. In some embodiments, the base layer 112 may be multi-layered or may contain a dispersed component suspended or dispersed in a continuous phase.

Figure 2:
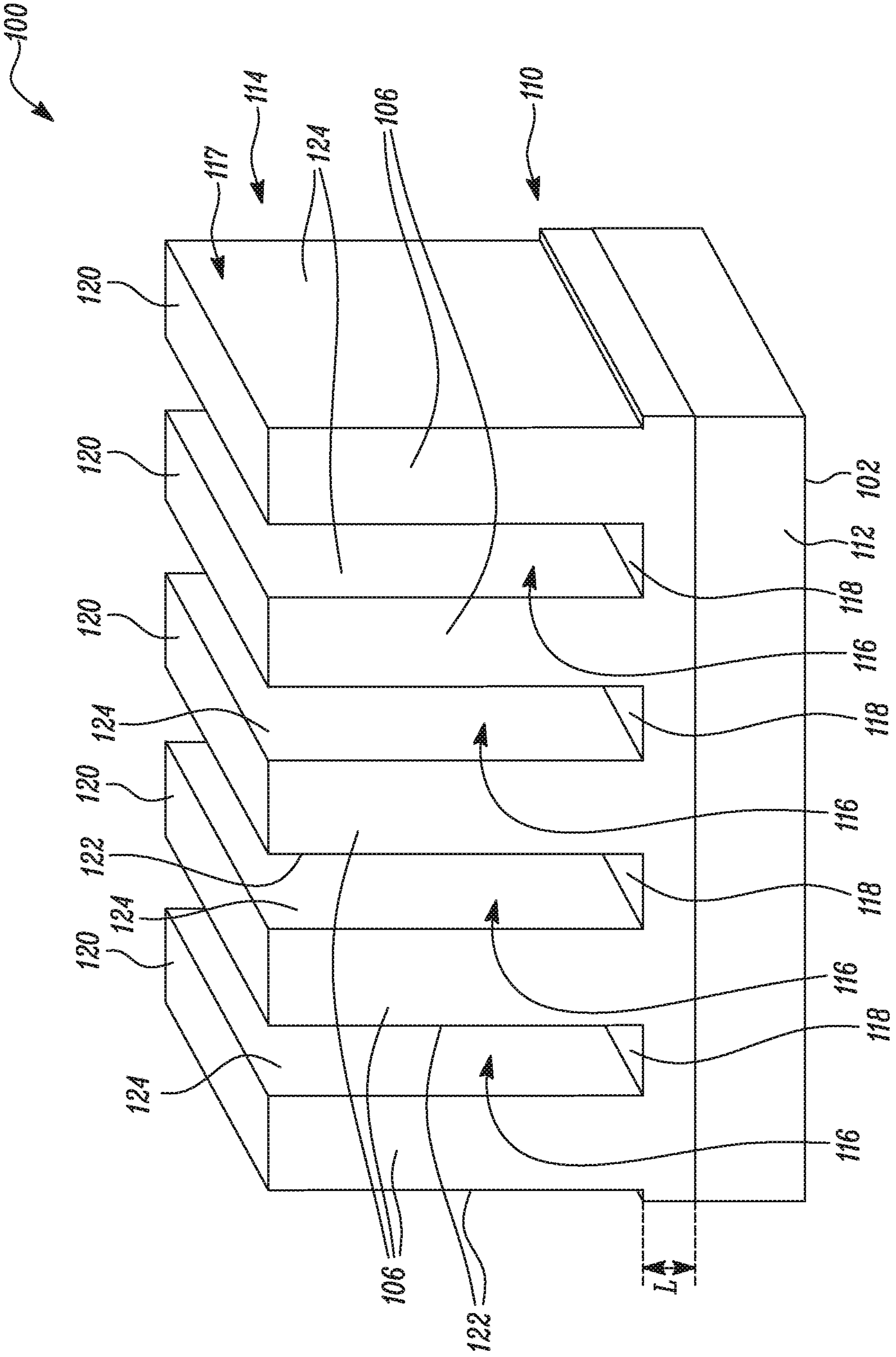
FIG. 2 is a perspective view of a base film of the light control film of FIG. 1.

Further, the louver structure 114 is a microstructure that generally includes structures, projections, or protrusions that deviate in profile from an average center line drawn through the microstructure. More particularly, as shown in FIG. 2, the louver structure 114 includes the plurality of transmissive regions 106 that are embodied as structures, and a plurality of channels 116. The plurality of light transmissive regions 106 are alternated with channels 116. More particularly, the plurality of channels 116 are formed between adjacent transmissive regions 106 of the plurality of transmissive regions 106. The channels 116 define a bottom surface 118. Each of the channels 116 is filled with a material 132 (shown in FIG. 1) similar to the material of the transmissive regions 106. In some examples, the channels 116 are overfilled with the material 132.

The transmissive regions 106 are micro-replicated on the base layer 112. An exemplary micro-replication process is described in U.S. Pat. No. 8,503,122 (Liu et al.). A typical micro-replication process includes depositing a polymerizable composition onto a master negative micro-structured molding surface in an amount barely sufficient to fill the cavities of the master. The cavities are then filled by moving a bead of the polymerizable composition between the base layer 112 and the master. The composition is then cured. The transmissive regions 106 may be formed on the base layer 112 by various methods, such as extrusion, cast-and-cure coating, or some other method.

In the illustrated embodiment, the transmissive regions 106 are typically integral with a land region "L", meaning that there is no interface between the land region "L" and the bottom surface 118. The land region "L" is defined between the base layer 112 and the bottom surface 118. A material of the land region "L" is similar to a material of the transmissive regions 106. Alternatively, the LCF 100 may lack such a land region "L" or an interface may be present between the land region "L" and the transmissive regions 106. In this embodiment, the land region "L" is disposed between the alternating transmissive regions 106 and absorptive regions 108 (see FIGS. 1 and 7) and the light input surface 102. Alternatively, in another embodiment wherein the surface 104 (see FIG. 1) may be the light input surface and the surface 102 may be the light output surface, the land region "L" may be disposed between the alternating transmissive regions 106 and absorptive regions 108 and the light output surface 104.

Each transmissive region 106 defines a top surface 120 and at least one side wall 122, 124 extending from the corresponding top surface 120 to the bottom surface 118. In the illustrated embodiment, each of the transmissive regions 106 includes a pair of side walls 122, 124. Accordingly, the microstructured film 110 has a surface 117 defined by the top surface 120 and the side walls 122, 124 of each light transmissive region 106 and the bottom surface 118 of each channel 116. Further, the transmissive regions 106 are embodied as ribs herein. Alternatively, the transmissive regions 106 may include a number of posts extending from the bottom surface 118. The transmissive regions 106 may be equally spaced apart from each other. Further, a cross-section of each of the plurality of transmissive regions 106 includes at least one of a square shape, a circular shape, a trapezoidal shape, and a polygonal shape. In the illustrated embodiment, the transmissive regions 106 have a generally rectangular shape.

Figure 3:
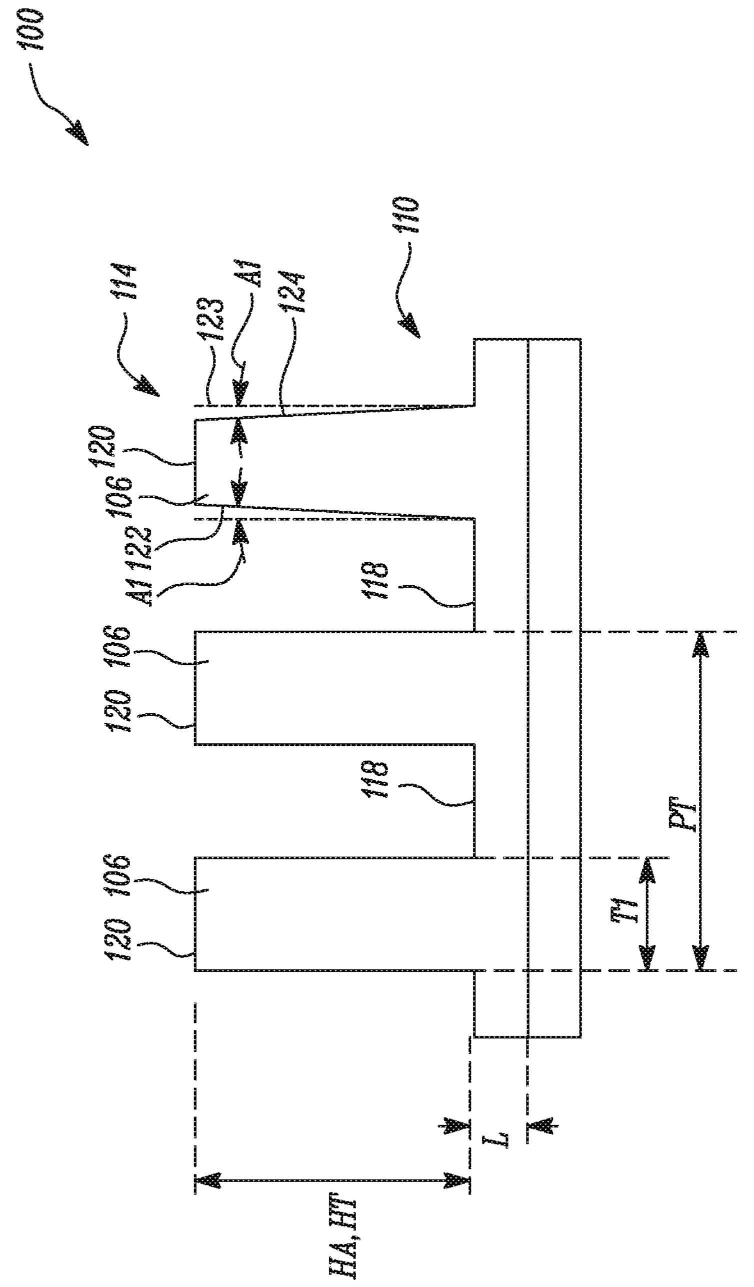
FIG. 3 is a side view illustrating angled side walls of the base film shown in FIG. 2.

As illustrated in FIG. 3, each of the side walls 122, 124 of one or more transmissive regions 106 may have a tapered profile. Further, the tapered profile of each of the side walls 122, 124 tapers towards the top surface 120. More particularly, the transmissive region 106 has a first wall angle "A1". The first wall angle "A1" may be interchangeably referred to as the wall angle "A1". The first wall angle "A1" is defined between each of the side walls 122, 124 of the transmissive regions 106 and lines 123. Further, the first wall angle "A1" may create a condition where one of the side walls 122, 124 of the transmissive region 106 collimates light while the other side wall 122, 124 of the transmissive region 106 de-collimates light.

Larger wall angles "A1" may decrease transmission at normal incidence or in other words a viewing angle of 0 degrees. Smaller wall angles "A1" are preferred such that the transmission of light at normal incidence can be made as large as possible. In some embodiments, the first wall angle "A1" of each transmissive region 106 is less than 5 degrees. In some embodiments, the wall angle "A1" is less than 10, 9, 8, 7, 6, or 5 degrees. In some embodiments, the wall angle "A1" is no greater than 2.5, 2.0. 1.5, 1.0, 0.5, or 0.1 degrees. In some embodiments, the wall angle "A1" is zero or approaching zero. When the wall angle "A1" is zero, an angle between the absorptive regions 108 (see FIGS. 1 and 7) and light output surface 104 (see FIG. 1) is 90 degrees. In such cases, the side walls 122, 124 may have a straight profile. Depending on the wall angle "A1", the transmissive regions 106 can have a square, rectangular, or trapezoidal cross-section. It should be noted that the first wall angle "A1" may facilitate a release of the base film 110 from a manufacturing tool that is used for manufacturing the base film 110.

Further, the transmissive regions 106 define the first refractive index. In some embodiments, the first refractive index is from about 1.20 to about 1.8. In an example, the first refractive index is approximately equal to 1.52. The transmissive regions 106 can be defined by a thickness "T1". Excluding the land region "L", the transmissive regions 106 typically have nominally a height "HT" that is similar to a height "HA" (see FIG. 1) of the absorptive regions 108. The LCF 100 typically includes the plurality of transmissive regions 106 having nominally same height "HT" and thickness "T1". In some embodiments, each of the transmissive regions 106 has an aspect ratio defined as a ratio of the height "HT" to the thickness "T1" of at least 1.75. In some embodiments, the aspect ratio of the transmissive regions 106 is at least 2.0, 2.5, 3.0, 3.5, 4.0, 4.5 or 5.0. In other embodiments, the aspect ratio of the transmissive regions 106 is at least 2, 3, 4, 5, 6, 7, 8, 9 or 10. In yet other embodiments, the aspect ratio of the transmissive regions 106 is at least 15, 20, 25, 30, 35, 40, 45, or 50.

In some embodiments, the transmissive regions 106 define a pitch "PT". The pitch "PT" is a distance between an onset of a first transmissive region 106 and an onset of an adjacently disposed second transmissive region 106. In some embodiments, the transmissive regions 106 have the pitch "PT" of at least 10 microns. In some embodiments, the pitch "PT" may be at least 15, 20, 25, 30, 35, 40, 45, or 50 microns. The pitch "PT" is generally no greater than 1 mm. In some embodiments, the pitch "PT" is typically no greater than 900, 800, 1100, 600, or 500 microns. In some embodiments, the pitch "PT" is typically no greater than 550, 500, 450, 400, 350, 300, 250, or 200 microns. In some embodiments, the pitch "PT" is no greater than 175, 150, or 100 microns. In typical embodiments, the transmissive regions 106 are evenly spaced, having a single pitch. Alternatively, the transmissive regions 106 may be spaced such that the pitch "PT" between adjacent transmissive regions 106 is not the same.

The pitch "PT" and the height "HT" of the transmissive regions 106 may be important to facilitate coating of the transmissive regions 106. When the transmissive regions 106 are spaced too close together it can be difficult to uniformly coat the side walls 122, 124. When the transmissive regions 106 are spaced too far apart, layers 126, 128, 130 (see FIG. 1) may not be effective at providing its intended function, such as privacy at off-axis viewing angles.

Each transmissive region 106 comprises a polymerizable resin. In some cases, the polymerizable resin may be optically clear having a substantially high transmission in a wavelength range from about 300 nanometers (nm) to about 800 nm. The polymerizable resin may include a combination of a first polymerizable component and a second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition may include a (meth) acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin.

Referring to FIGS. 1 and 2, the absorptive regions 108 (see in FIG. 1) include a light absorbing material. Light absorbing materials useful for forming the absorptive regions 108 can be any suitable material that functions to absorb or block light at least in a portion of the visible spectrum. Preferably, the light absorbing material can be coated or otherwise provided on top of the first low index layer 128 (see FIG. 1). Exemplary light absorbing materials include a black or other light absorbing colorant (such as carbon black or another pigment or dye, or combinations thereof). Other light absorbing materials can include particles or other scattering elements that can function to block light from being transmitted through the absorptive regions 108.

Moreover, in some examples, each absorptive region 108 may include a second wall angle "A2" (shown in FIG. 17) complementary to the first wall angle "A1". Further, the absorptive regions 108 have the height "HA". In typical embodiments, the height "HA" of the absorptive regions 108 is at least 30, 40, 50, 60, 110, 80, 90, or 100 microns. In some embodiments, the height "HA" is no greater than 200, 190, 180, 170, 160, or 150 microns. In some embodiments, the height "HA" is no greater than 140, 130, 120, 110, or 100 microns. The absorptive regions 108 have a thickness "TA" and are spaced apart by a pitch "PA". Further, the pitch "PA" of the absorptive regions 108 is within the same range as described for the transmissive regions 106.

The thickness "TA" of the absorptive regions 108 adjacent to the bottom surface 118 is typically nominally the same as the thickness "TA" of the absorptive regions 108 adjacent to the top surface 120. However, when the thickness "TA" of the absorptive regions 108 adjacent to the bottom surface 118 differs from the thickness "TA" adjacent the top surface 120, the thickness "TA" is defined by a maximum thickness. The maximum thickness of the absorptive regions 108 can be averaged for an area of interest, such as an area in which the transmission (e.g. brightness) is measured. The LCF 100 typically includes the absorptive regions 108 having nominally the same height "HA" and thickness "TA". The thickness "TA" of each absorptive region 108 is from about 100 nm to about 1500 nm. In some embodiments, the aspect ratio of each absorptive region 108 is at least 30. The aspect ratio of the absorptive regions 108 is defined as a ratio of the height "HA" to the thickness "TA". Each absorptive region 108 has a third refractive index greater than a second refractive index. Additionally, an extinction coefficient of each absorptive region 108 is from about 0.2 to about 0.5. The term extinction coefficient as used herein may refer to a measurement of light attenuation by materials at a given wavelength. In a specific example, the absorptive regions 108 include a refractive index of 1.8, an extinction coefficient of 0.33, and a thickness "TA" of 335 nm, without any limitations.

The LCF 100 includes alternating transmissive regions 106 and absorptive regions 108 and the low index layers 128, 130 Further, the transmissive regions 106 between the absorptive regions 108 have an interface angle "θI" defined by the geometry of the alternating transmissive regions 106 and the absorptive regions 108. Further, a polar cut-off viewing angle "θP" is defined by the LCF 100 that is equal to the sum of a polar cut-off viewing half angle "θ1" and a polar cut-off viewing half angle "θ2" each of which are measured from the normal to the light input surface 102. In typical embodiments, the polar cut-off viewing angle "θP" is symmetric, and the polar cut-off viewing half angle "θ1" is equal to the polar viewing half angle "θ2". Alternatively, the polar cut-off viewing angle "θP" can be asymmetric, and the polar cut-off viewing half angle "θ1" is not equal to the polar cut-off viewing half angle "θ2". The viewing angle "θP" can range from −90 degrees to +90 degrees. A viewing angle "θP" of 0 degrees is orthogonal to the light input surface 102; whereas viewing angles "θP" of −90 degrees and +90 degrees are parallel to the light input surface 102.

The alternating transmissive and absorptive regions 106, 108 or the LCF 100 can exhibit increased relative transmission (e.g. brightness) at a viewing angle "θP" of 0 degrees. In some embodiments, the relative transmission (e.g. brightness) is at least 75, 80, 85, or 90%. The relative transmission (e.g. brightness) is typically less than 100%. In typical embodiments, the LCF 100 has significantly lower transmission at other viewing angles "θP". For example, in some embodiments, the relative transmission (e.g. brightness) at a viewing angle "θP" of −30 degrees, +30 degrees, or an average of −30 degrees and +30 degrees is less than 50, 45, 40, 35, 30, or 25%. In other embodiments, the relative transmission (e.g. brightness) at a viewing angle "θP" of 30 degrees, +30 degrees, or the average of −30 degrees and +30 degrees is less than 25, 20, 15, 10 or 5%. In some embodiments, the relative transmission (e.g. brightness) at a viewing angle "θP" of +/−35, +/−40, +/−45, +/−50, +/−55, +/−60, +/−65, +/−70, +/−75, or +/−80 degrees is less than 25, 20, 15, 10 or 5%, or less than 5%. In some embodiments, the average relative transmission (e.g. brightness) for viewing angles "θP" ranging from +35 to +80 degrees, −35 to −80 degrees, or the average of these ranges is less than 10, 9, 8, 7, 6, 5, 4, 3, or 2%. Further, the LCF 100 with significantly lower transmission at "off-axis" viewing angles (e.g., beyond about 30 degrees) may be suitable for use as privacy films. Such films may allow a viewer directly in front of a display (viewing angle "θP" of 0 degrees) to see the image yet blocks viewers at "off-axis" angles from seeing such image.

Figure 20:
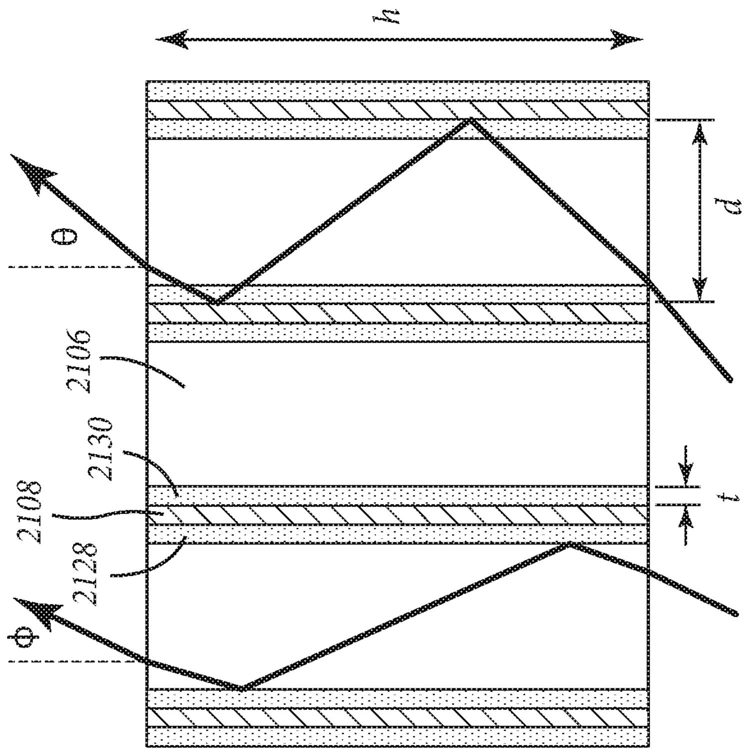
FIG. 20 is a side view illustration of a light control film according to an embodiment of the present disclosure illustrating design parameters.

The LCF design objectives include maximizing the transmission of light along the direction of the clear channels while strongly attenuating those light paths beyond a designated cut-off angle. To accomplish these objectives the design considers parameters such as the index of refraction of the resin composing the transmissive regions or "clear channels" (n_CCF), the index of refraction of the low index coating or "clear coating" (n-clear), the thickness of the clear coating (t), the adsorptive region height or louver height (h) and the width of the clear channel region (d) (shown in FIG. 20).

For on-axis light paths of low polar angle φ (i.e. φ<20°), the design requires total internal reflection (TIR) reflections on interface between clear channels and clear coating. To accomplish TIR for low angle polar rays φ, we require:

$$n\_clear < n\_CCF * \sin(90° - \operatorname{asin}(\sin(\varphi)/n\_CCF)) \quad \text{(eqn X)}$$

For a particular example, if n_CCF=1.52 and φ=20°, then this first design objective requires n_clear<1.48

For light beyond designated cutoff angle θ (i.e. θ>35°), the light paths do not exhibit TIR at clear channel to clear coating interface such that the light is directed to louver. Since each reflection of light ray off from louver surface provides additional attenuation, the design objective requires at least two reflections off the louver wall to accentuate the attenuation of all rays for light beyond designated cutoff angle, θ. This second requirement for at least two louver reflections for the higher angle light rays drives the design to require:

$$h>2*d*\tan((90°-\operatorname{asin}(\sin(\theta)/n\_CCF))) \quad \text{(eqn Y)}$$

For a particular example, if n_CCF=1.52 and θ=35°, then this second design objective requires louver height of h>5d Luminance can be measured according to the test method described in the examples. The luminance can be measured on the alternating transmissive and absorptive regions 108 or the total LCF 100 that may further comprise a cover film Relative transmission (e.g. brightness of visible light) is defined as the percentage of luminance, at a specified viewing angle or range of viewing angles, between a reading with the LCF 100 including the alternating transmissive and absorptive regions 106, 108 and the layers 128, 130 and a reading without the LCF 100 (i.e. the baseline).

The absorptive regions 108 are sandwiched between the layers 128, 130. In one embodiment, the absorptive regions 108 and the layers 128, 130 are formed by a combination of additive and subtractive methods. Further, the LCF 100 includes the plurality of low index layers 128, 130, wherein each low index layer 128, 130 is disposed between each transmissive region 106 and an adjacent absorptive region 108, and wherein each low index layer 128, 130 has the second refractive index less than the first refractive index of each transmissive region 106. In some cases, the refractive index of the low index layers 128, 130 may be defined relative to refractive indices of the base film 110 and the backfilled material 132.

In an example, a ratio between the first refractive index and the second refractive index is from about 1.01 to about 1.50. In another example, the ratio between the first refractive index and the second refractive index is from about 1.02 to about 1.20. In some embodiments, an extinction coefficient of each low index layer 128, 130 is from about 0 to about 0.08. Each low index layer 128, 130 comprises at least one of a metal, a resin, a metal oxide, a silicon based material, an air encapsulated coating, and a fluorine based material. Each of the low index layers 128, 130 has a thickness "TL" (shown in FIG. 1). In some examples, the first and second low index layers 128, 130 are wedge shaped (shown in FIG. 17). Moreover, in an example, an average thickness "TL" of each low index layer 128, 130 is from about 50 nm to about 950 nm. In another example, an average thickness "TL" of each low index layer 128, 130 is from about 150 nm to about 950 nm.

Figure 4:
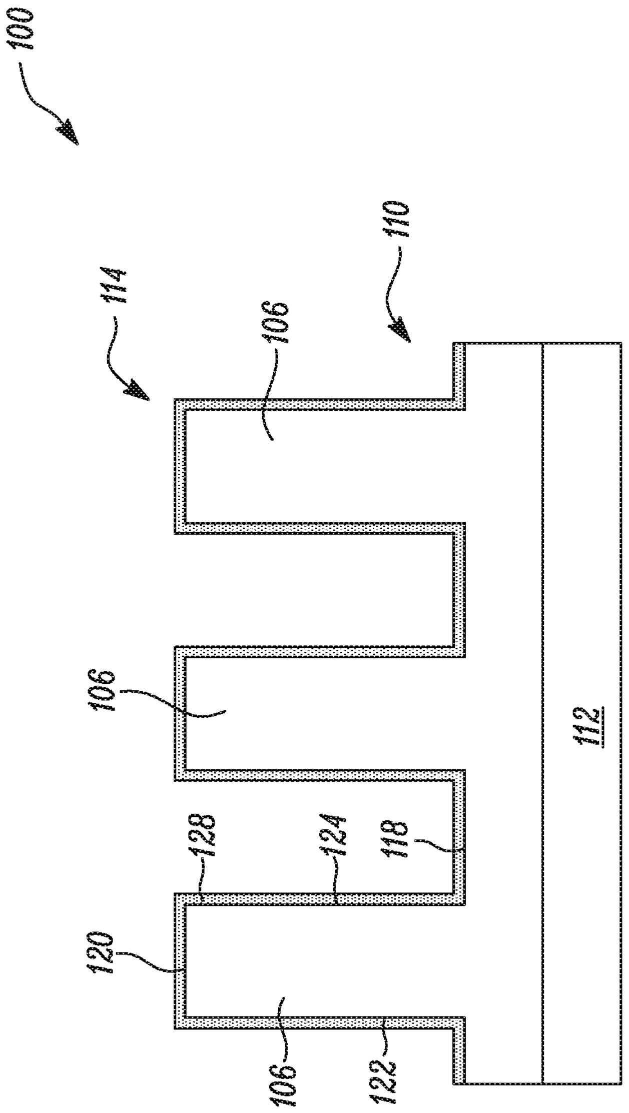
FIG. 4 is a side view illustrating a first low index layer provided on the base film of FIG. 2.

In the illustrated embodiment, the LCF 100 includes the plurality of first low index layers 128 and the plurality of second low index layers 130. It should be noted that the term "first low index layer 128" may be interchangeably referred to as "the layer 128". Further, the term "second low index layer 130" may be interchangeably referred to as "the layer 130". As shown in FIG. 4, the first low index layer 128 of a low refractive index material is provided on each of the side walls 122, 124, the top surface 120, and the bottom surface 118 of the transmissive regions 106. The first low index layer 128 is formed by depositing the low refractive index material on each of the plurality of transmissive regions 106 and the bottom surface 118. The first low index layer 128 of the low refractive index material is applied by at least one of sputtering, plasma enhanced chemical vapor deposition, vacuum condensation and polymerization, and layer-by-layer assembly. These processes allow an additional potential advantage of controlling a uniformity of a thickness of the first low index layer 128 along the side walls 122, 124.

Figure 5:
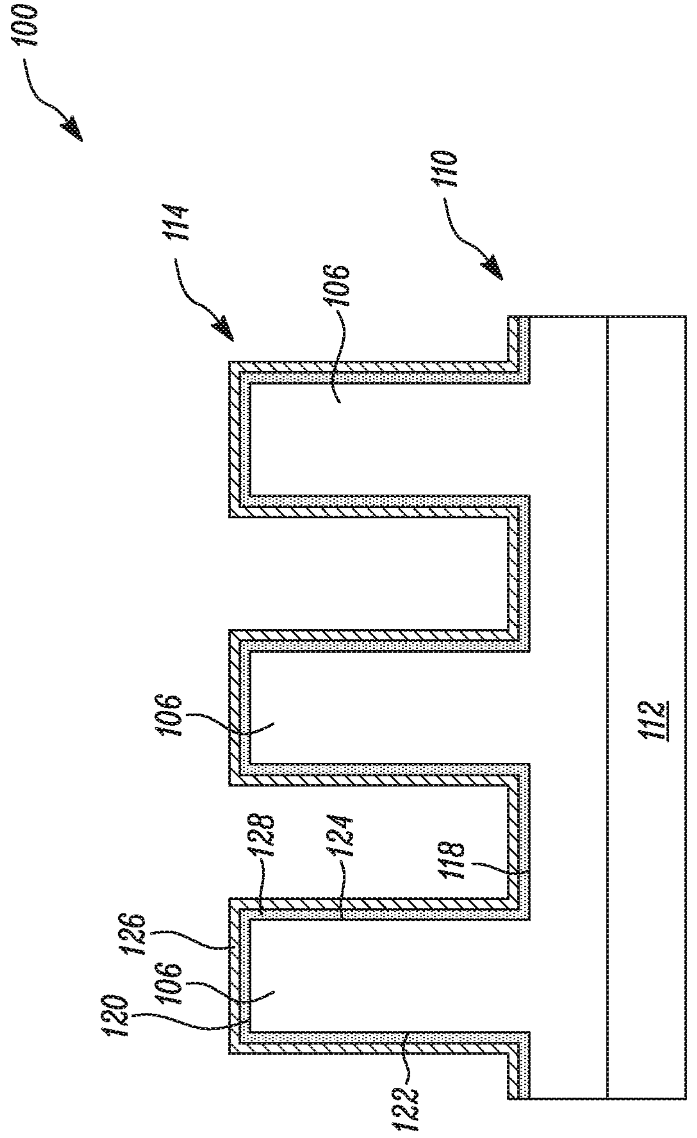
FIG. 5 is a side view illustrating a layer of absorptive material provided on the first low index layer of FIG. 4.

Referring to FIG. 5, the absorptive regions 108 (see FIGS. 1 and 7) are provided based on the application of the layer 126. More particularly, the layer 126 of the light absorptive material is applied on top of the first low index layer 128. The layer 126 may also be identified as a core layer. The layer 126 may be applied by at least one of sputtering, plasma enhanced chemical vapor deposition, vacuum condensation and polymerization, and layer-by-layer assembly.

Figure 6:
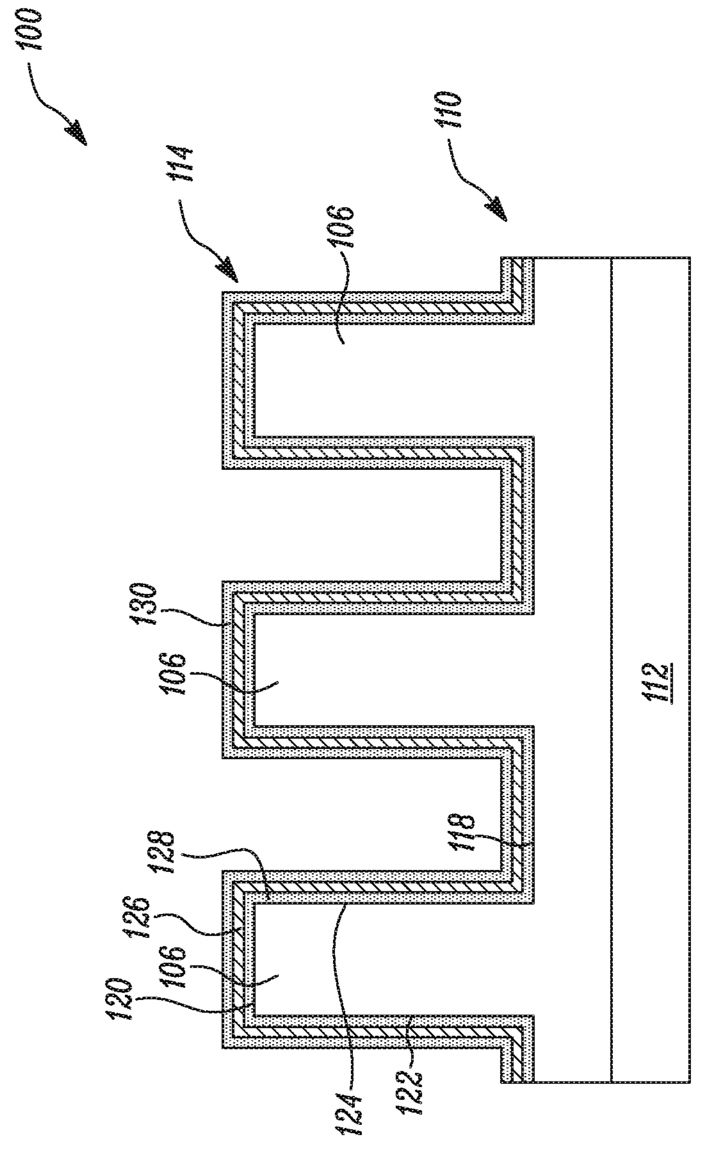
FIG. 6 is a side view illustrating a second low index layer provided on the layer of absorptive material of FIG. 5.

As shown in FIG. 6, the second low index layer 130 is provided on top of the layer 126. The second low index layer 130 is formed by depositing the low refractive index material on each of the plurality of transmissive regions 106 and the bottom surface 118. The second low index layer 130 of the low refractive index material is applied by at least one of sputtering, plasma enhanced chemical vapor deposition, vacuum condensation and polymerization, and layer-by-layer assembly. These processes allow an additional potential advantage of controlling a uniformity of a thickness of the second low index layer 130 along the side walls 122, 124.

Figure 7:
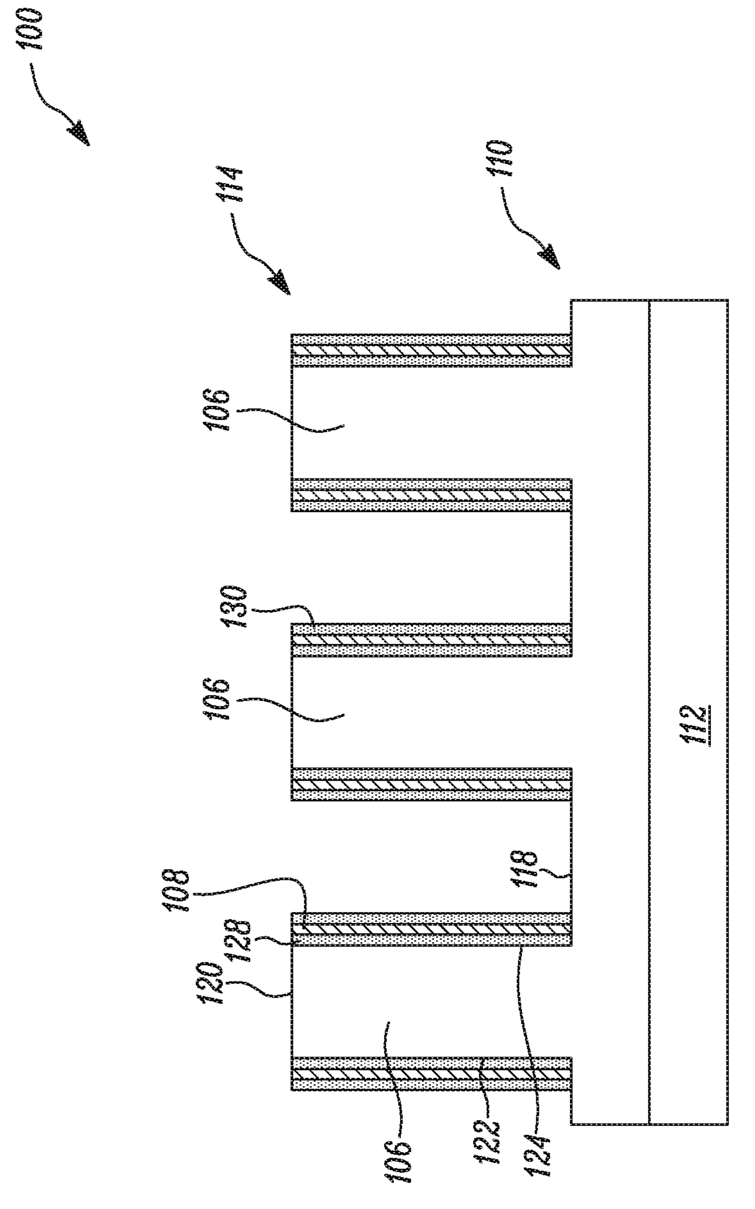
FIG. 7 is a side view illustrating the light control film with the first low index layer, an absorptive region, and the second low index layer removed from a top surface and a bottom surface of the light control film.
Figure 8:
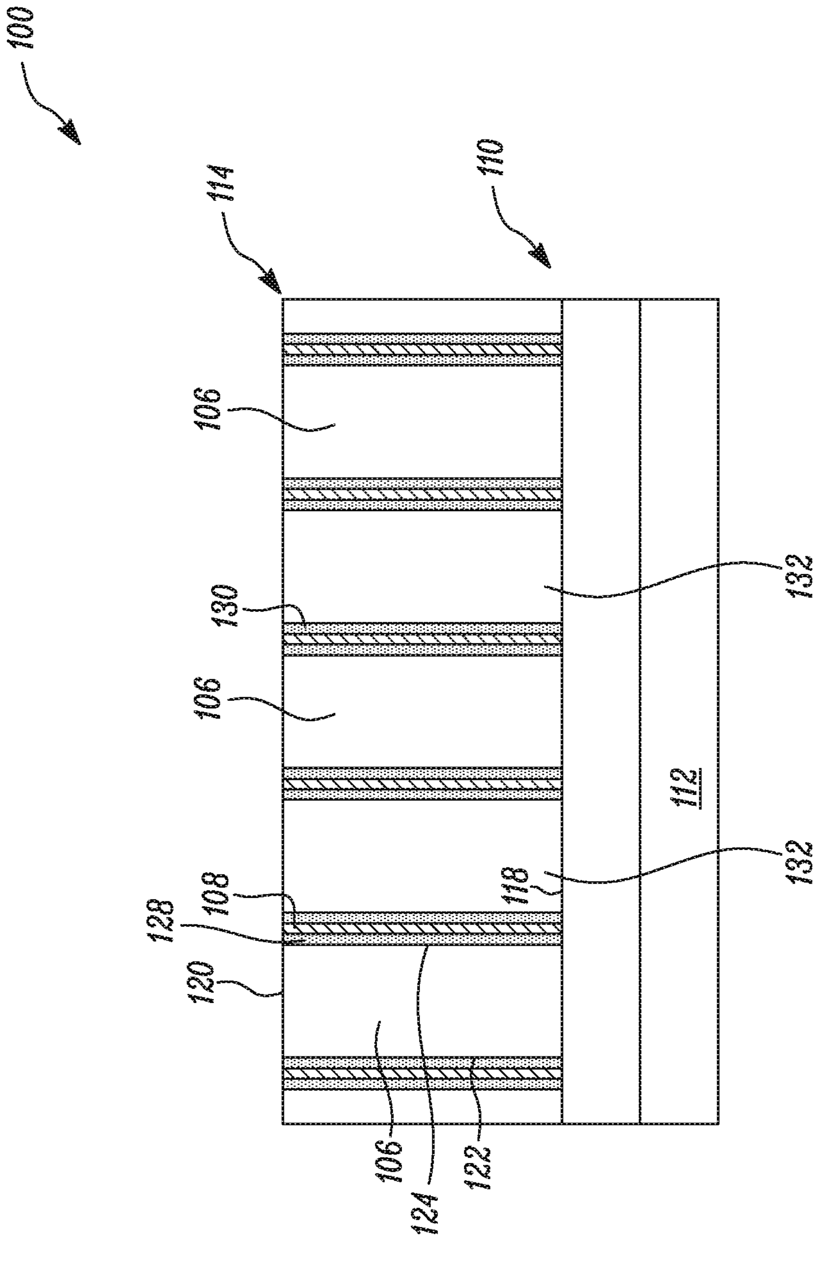
FIG. 8 is a side view illustrating the light control film with material filled in channels of the light control film.

Referring now to FIG. 7, a portion of the first low index layer 128, the layer 126 (see FIG. and the second low index layer 130 is selectively removed from the top surface 120 of each of the plurality of transmissive regions 106 and the bottom surface 118 while retaining the first low index layer 128, the layer 126, and the second low index layer 130 on the side walls 122, 124 of each of the plurality of transmissive regions 106. The first low index layer 128, the layer 126, and the second low index layer 130 are selectively removed by a selective etching process. The selective etching process may include a reactive-ion etching process or a sputter etching process. Alternatively, the first low index layer 128, the layer 126, and the second low index layer 130 are selectively removed by a laser ablation process. Referring to FIGS. 1 and 7, the first low index layer 128, the layer 126, and the second low index layer 130 that is retained on the pair of side walls 122, 124 of each of the plurality of transmissive regions 106 are embodied as the first low index layer 128, the absorptive regions 108, and the second low index layer 130, respectively. The process of removal of the layers 126, 128, 130 from the top surface 120 and the bottom surface 118 may result in some residue. As shown in FIG. 8, after formation of the layers 128, 130 and the absorptive regions 108, the channels 116 are backfilled with the material 132. In some examples, the channels 116 are overfilled with the material 132.

Figure 9:
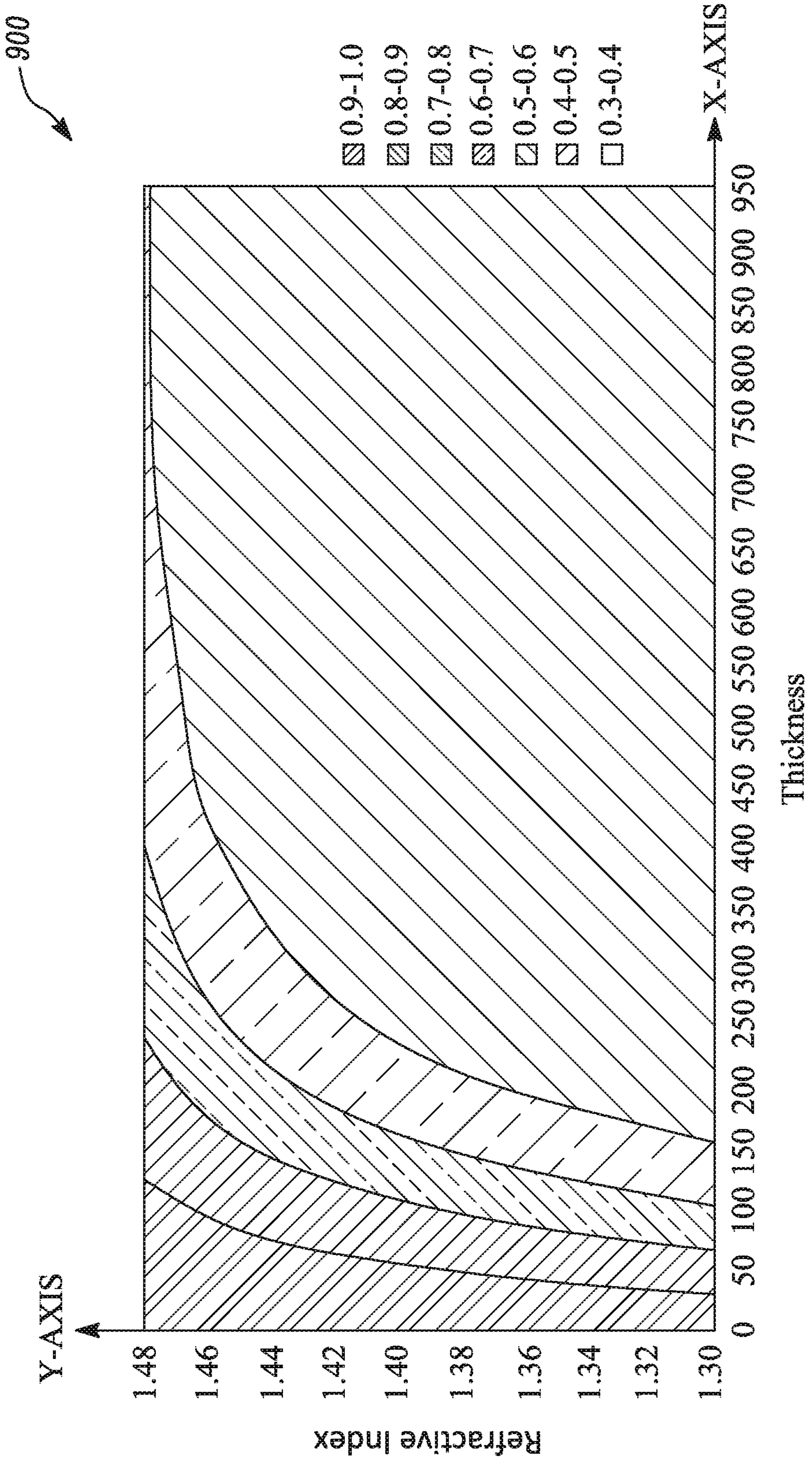
FIG. 9 is an exemplary plot depicting a top hat performance of the light control film of FIG. 1.

FIG. 9 illustrates an exemplary plot 900 depicting a top hat performance of the LCF 100. The plot 900 shows a variation of a ratio (L20/L0) of luminance at an incidence angle of 20 degrees to luminance at normal incidence for different values of the second refractive index and different values of the thickness "TL" of the low index layers 128, 130 (shown in FIG. 1). Various values for the thickness "TL" in nm of the low index layers 128, 130 are marked on the X-axis. Further, various values for the second refractive index of the low index layers 128, 130 are marked on the Y-axis. For generating the plot 900, the first refractive index of the transmissive regions 106 was chosen to be about 1.518. The transmissive regions 106 have a square shape. The third refractive index of the absorptive regions 108 was chosen to be about 1.8. The extinction coefficient and the thickness "TA" of the absorptive regions 108 were chosen to be 0.33 and 335 nm, respectively. From the plot 900, it may be concluded that the variation of luminance with incidence angle is minimum (i.e., L20/L0 is 0.9-1.0) for the thickness "TL" greater than 150 nm. Further, the variation of luminance with incidence angle is minimum for the second refractive index greater than about 1.30 and less than 1.48. Further, the ratio between the first and second refractive indices is greater than 1.02 and less than 1.20.

Figure 10:
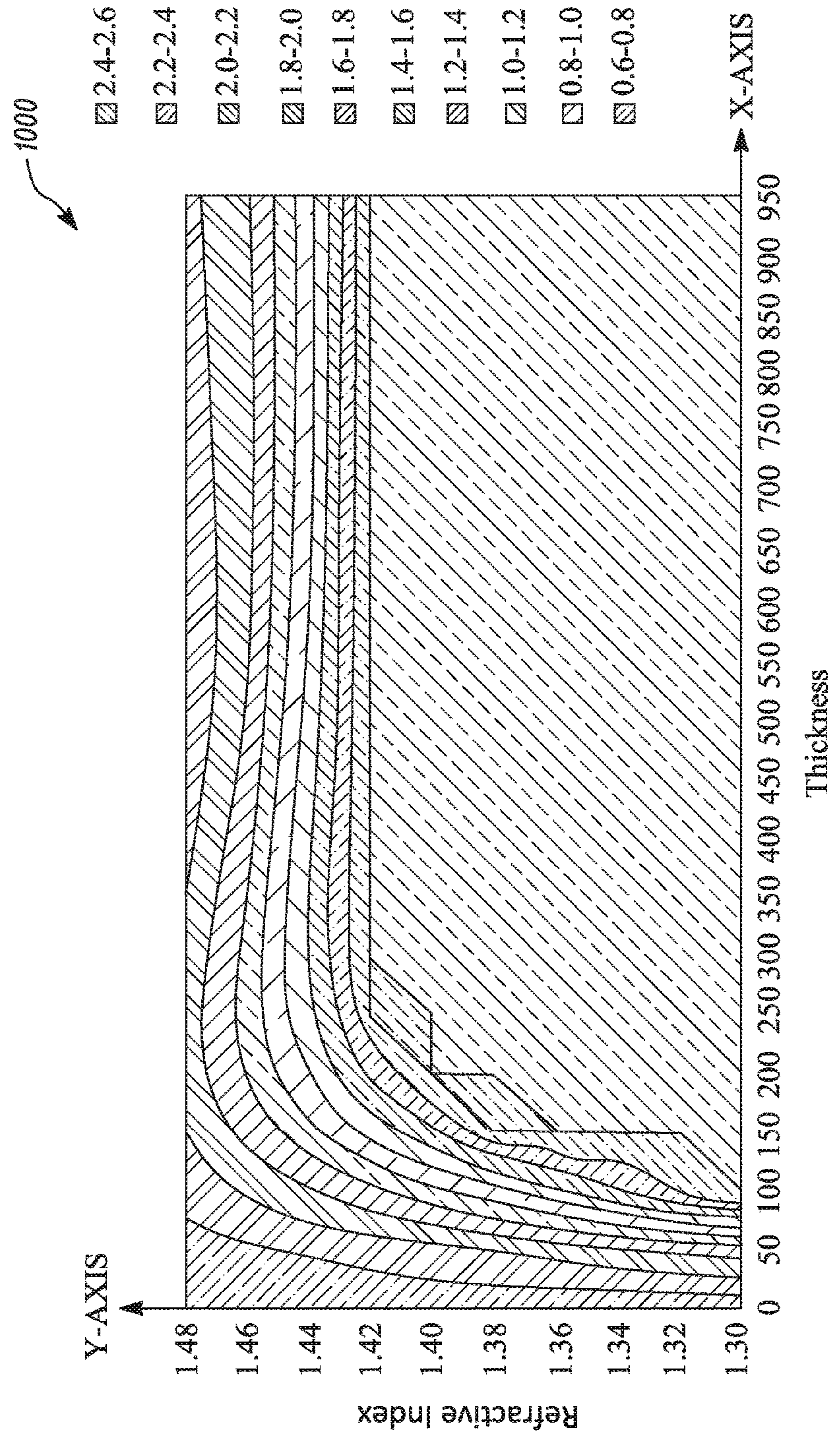
FIG. 10 is an exemplary plot depicting a merit function of the light control film of FIG. 1.

FIG. 10 illustrates an exemplary plot 1000 depicting a merit function of the LCF 100 for light cut-off angle above 30 degrees. The merit function is defined as a sum of the louver transmission for the polar cut-off viewing angle "θP" ranging from 30 degrees to 90 degrees. More particularly, the merit function is defined by the sum of the louver transmissions for polar cut-off viewing angle "θP" of 31.5 degrees, 34.5 degrees, 37.5 degrees, up to 88.5 degrees with 3 degrees increment (i.e., T(31.5°)+T(34.5°)+T(37.5°)+ . . . +T(88.5°)). The 3 degrees increment was used in the model as angular resolution. Various values for the thickness "TL" in nm of the low index layers 128, 130 are marked on the X-axis. Further, various values of the second refractive index of the low index layers 128, 130 are marked on the Y-axis. The plot 1000 shows that the LCF 100 provides sufficient light cut-off above 30 degrees for various ranges of the thickness "TL" and second refractive index. The actual definition of sufficient may vary based on the application of the LCF 100.

Figure 11:
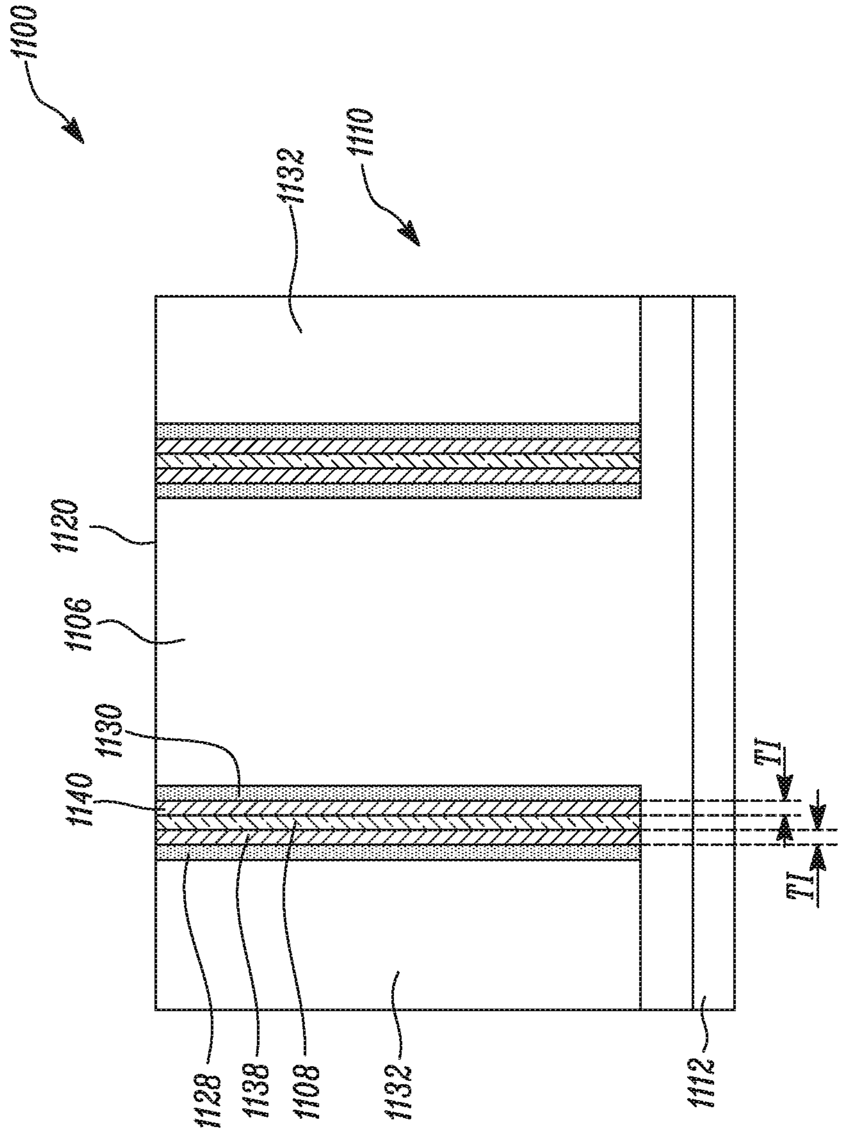
FIG. 11 is a side view illustrating another light control film according to an embodiment of the present disclosure.

Referring now to FIG. 11, a base film 1110 associated with another LCF 1100 is illustrated. The base film 1110 is similar to the base film 110 described in relation to FIGS. 1 to 7. The base film 1110 may be formed by micro-replication. The base film 1110 includes a base layer 1112, a plurality of transmissive regions 1106, a plurality of absorptive regions 1108, and a plurality of channels 1116 (shown in FIG. 12) similar to the base layer 112, the plurality of transmissive regions 106, the plurality of absorptive regions 108, and the plurality of channels 116, respectively, of the base film 110. In the illustrated example, the first refractive index of the transmissive regions 1106 is approximately equal to 1.518.

Figure 12:
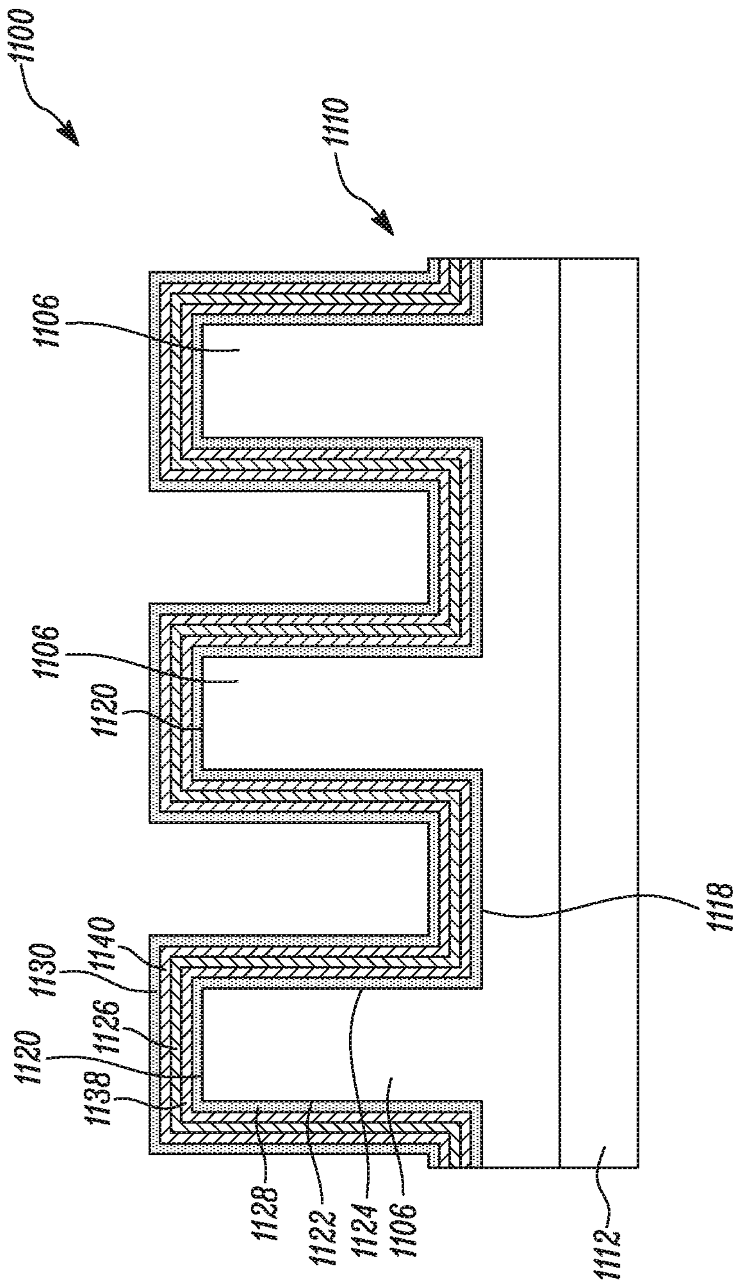
FIG. 12 is a side view illustrating the light control film having a first low index layer, a first intermediate index layer, a layer of absorptive material, a second intermediate index layer, and a second low index layer.

Referring to FIGS. 11 and 12, each of the plurality of transmissive regions 1106 defines a top surface 1120 and at least one side wall 1122, 1124 extending from the corresponding top surface 1120 to a bottom surface 1118. In the illustrated embodiment, the LCF 1100 includes the low index layers 1128, 1130, and more particularly, the plurality of first low index layers 1128 and the plurality of second low index layers 1130. The low index layers 1128, 1130 are similar to the low index layers 128, 130, respectively. In one specific example, the low index layers 1128, 1130 may have an extinction coefficient of 0. It should be noted that the term "first low index layer 1128" may be interchangeably referred to as "the layer 1128". Further, the term "second low index layer 1130" may be interchangeably referred to as "the layer 1130". The first low index layer 1128 of the low refractive index material is provided on each of the side walls 1122, 1124, the top surface 1120, and the bottom surface 1118 of the transmissive regions 1106. The first low index layer 1128 is formed by depositing the low refractive index material on each of the plurality of transmissive regions 1106 and the bottom surface 1118. The first low index layer 1128 of the low refractive index material is applied by at least one of sputtering, plasma enhanced chemical vapor deposition, vacuum condensation and polymerization, and layer-by-layer assembly. These processes allow an additional potential advantage of controlling a uniformity of the thickness "TL" of the first low index layer 1128 along the side walls 1122, 1124.

Moreover, the LCF 1100 includes an intermediate index layer 1138, 1140 disposed between each low index layer 1128 and an adjacent absorptive region 1108, wherein each intermediate index layer 1138, 1140 has a fourth refractive index greater than the second refractive index of each low index layer 1128. Further, the fourth refractive index is greater than the first refractive index of each transmissive region 1106. The fourth refractive index is from about 1.2 to about 1.8. Moreover, an extinction coefficient of each intermediate index layer 1138, 1140 is from about 0.005 to about 0.08. In one specific example, the intermediate index layers 1138, 1140 have a refractive index of 1.6 and an extinction coefficient of 0.06. Further, each intermediate index layer 1138, 1140 comprises at least one of a metal, a resin, a metal oxide, a silicon based material, and a fluorine based material.

In the illustrated example, the LCF 1100 includes the first intermediate index layer 1138 disposed between the first low index layer 1128 and the adjacent absorptive region 1108. More particularly, the first intermediate index layer 1138 of an intermediate refractive index material is provided on the first low index layer 1128. It should be noted that the term "first intermediate index layer 1138" may be interchangeably referred to as "the layer 1138". The first intermediate index layer 1138 is formed by depositing the intermediate refractive index material on each of the plurality of transmissive regions 1106 and the bottom surface 1118. The first intermediate index layer 1138 of the intermediate refractive index material is applied by at least one of sputtering, plasma enhanced chemical vapor deposition, vacuum condensation and polymerization, and layer-by-layer assembly. These processes allow an additional potential advantage of controlling a uniformity of a thickness "TI" of the first intermediate index layer 1138 along the side walls 1122, 1124.

Further, the absorptive regions 1108 are provided based on the application of a layer 1126. More particularly, the layer 1126 of a light absorptive material is applied on first intermediate index layer 1138. The layer 1126 may also be identified as a core layer. The layer 1126 may be applied by at least one of sputtering, plasma enhanced chemical vapor deposition, vacuum condensation and polymerization, and layer-by-layer assembly.

Figure 13:
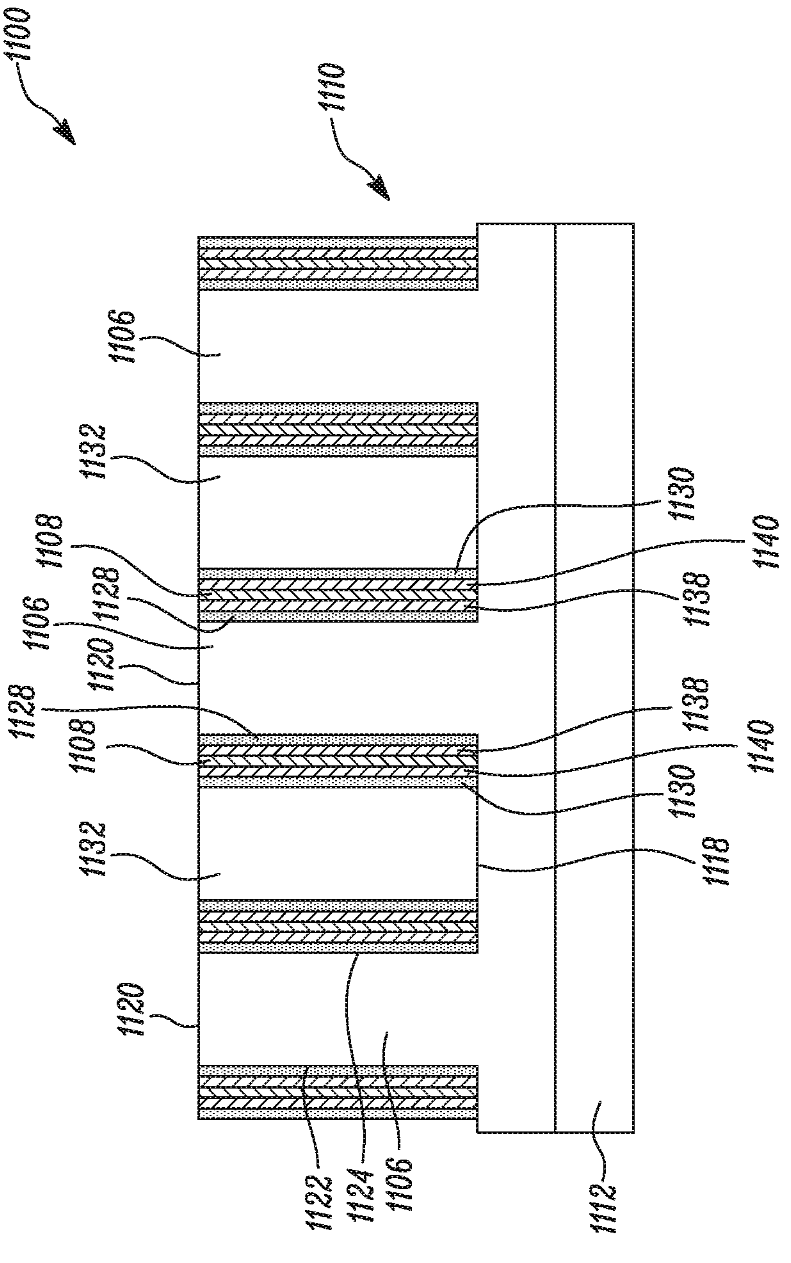
FIG. 13 is a side view illustrating the light control film with the first low index layer, the first intermediate index layer, an absorptive region, the second intermediate index layer, and the second low index layer removed from a top surface and a bottom surface of the light control film.

Further, the LCF 1100 includes the second intermediate index layer 1140 disposed between the second low index layer 1130 and the adjacent absorptive region 1108 (see FIGS. 11 and 13). More particularly, the second intermediate index layer 1140 of the intermediate refractive index material is provided on the layer 1126. It should be noted that the term "second intermediate index layer 1140" may be interchangeably referred to as "the layer 1140". The second intermediate index layer 1140 is formed by depositing the intermediate refractive index material on each of the plurality of transmissive regions 1106 and the bottom surface 1118. The second intermediate index layer 1140 of the intermediate refractive index material is applied by at least one of sputtering, plasma enhanced chemical vapor deposition, vacuum condensation and polymerization, and layer-by-layer assembly. These processes allow an additional potential advantage of controlling a uniformity of a thickness "TI" of the second intermediate index layer 1140 along the side walls 1122, 1124.

Further, the second low index layer 1130 of the low refractive index material is applied on the second intermediate index layer 1140. The second low index layer 1130 of the low refractive index material is applied by at least one of sputtering, plasma enhanced chemical vapor deposition, vacuum condensation and polymerization, and layer-by-layer assembly. These processes allow an additional potential advantage of controlling a uniformity of a thickness of the second low index layer 1130 along the side walls 1122, 1124.

Further, a portion of the first low index layer 1128, the first intermediate index layer 1138, the layer 1126, the second intermediate index layer 1140, and the second low index layer 1130 is selectively removed from the top surface 1120 of each of the plurality of transmissive regions 1106 and the bottom surface 1118 while retaining the first low index layer 1128, the first intermediate index layer 1138, the layer 1126, the second intermediate index layer 1140, and the second low index layer 1130 on the side walls 1122, 1124 of each of the plurality of transmissive regions 1106. The first low index layer 1128, the first intermediate index layer 1138, the layer 1126, the second intermediate index layer 1140, and the second low index layer 1130 are selectively removed by a selective etching process. The selective etching process may include a reactive-ion etching process or a sputter etching process. Alternatively, the first low index layer 1128, the first intermediate index layer 1138, the layer 1126, the second intermediate index layer 1140, and the low index layer 1130 are selectively removed by a laser ablation process.

As shown in FIG. 13, the first low index layer 1128, the first intermediate index layer 1138, the layer 1126 (see FIG. 12), the second intermediate index layer 1140, and the second low index layer 1130 that is retained on the pair of side walls 1122, 1124 of each of the plurality of transmissive regions 1106 are embodied as the first low index layer 1128, the first intermediate index layer 1138, the absorptive region 1108, the second intermediate index layer 1140, and the second low index layer 1130, respectively. The process of removal of the layers 1126, 1128, 1130, 1138, 1140 from the top surface 1120 and the bottom surface 1118 may result in some residue. Further, after application of the layers 1128, 1130, 1138, 1140 and the absorptive regions 1108, the channels 1116 are overfilled with the material 1132. In some examples, the channels 1116 are overfilled with the material 1132.

Figure 14:
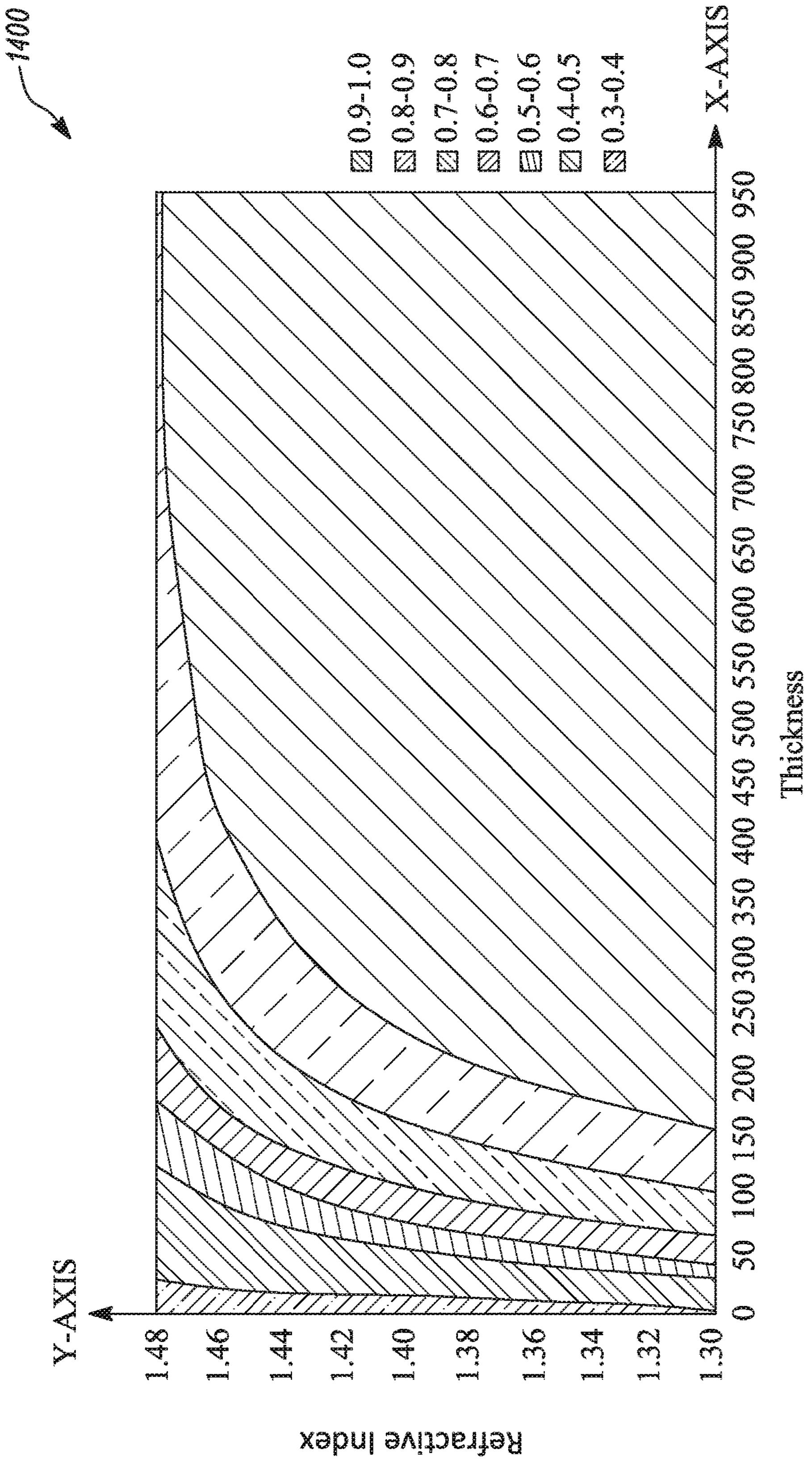
FIG. 14 is an exemplary plot depicting a top hat performance of the light control film of FIG. 11.

FIG. 14 illustrates an exemplary plot 1400 depicting a top hat performance of the LCF 1100. The plot 1400 shows a variation of a ratio (L20/L0) of luminance at an incidence angle of 20 degrees to luminance at normal incidence for different values of the second refractive index and different values of the thickness "TL" of the low index layers 1128, 1130. Various values for the thickness "TL" in nm of the low index layers 1128, 1130 are marked on the X-axis. Further, various values for the second refractive index of the low index layers 1128, 1130 are marked on the Y-axis.

For generating the plot 1400, the first refractive index of the transmissive regions 1106 was chosen to be about 1.518. The transmissive regions 1106 have a square shape. The third refractive index of the absorptive regions 1108 was chosen to be about 1.8. The extinction coefficient and the thickness "TA" of the absorptive regions 1108 were chosen to be 0.33 and 335 nm, respectively. It should be noted that the fourth refractive index and the thickness "TI" of the intermediate layers 1138, 1140 are kept constant for the plot 1400. Further, the fourth refractive index, the extinction coefficient, and the thickness "TI" of the intermediate index layers 1138, 1140 was chosen as 1.6, 0.06, and 200 nm, respectively. The extinction coefficient of the low index layers 1128, 1130 was chosen as 0, whereas the values for second refractive index and the thickness "TL" were varied across the Y-axis and X-axis, respectively.

From the plot 1400, it may be concluded that the variation of luminance with incidence angle is minimum (i.e., L20/L0 is 0.9-1.0) for the thickness "TL" greater than 150 nm. Further, the variation of luminance with incidence angle is minimum for the second refractive index greater than about 1.30 and less than 1.48. Further, the ratio between the second and fourth refractive indices is greater than 0.8 and less than 1.

Figure 15:
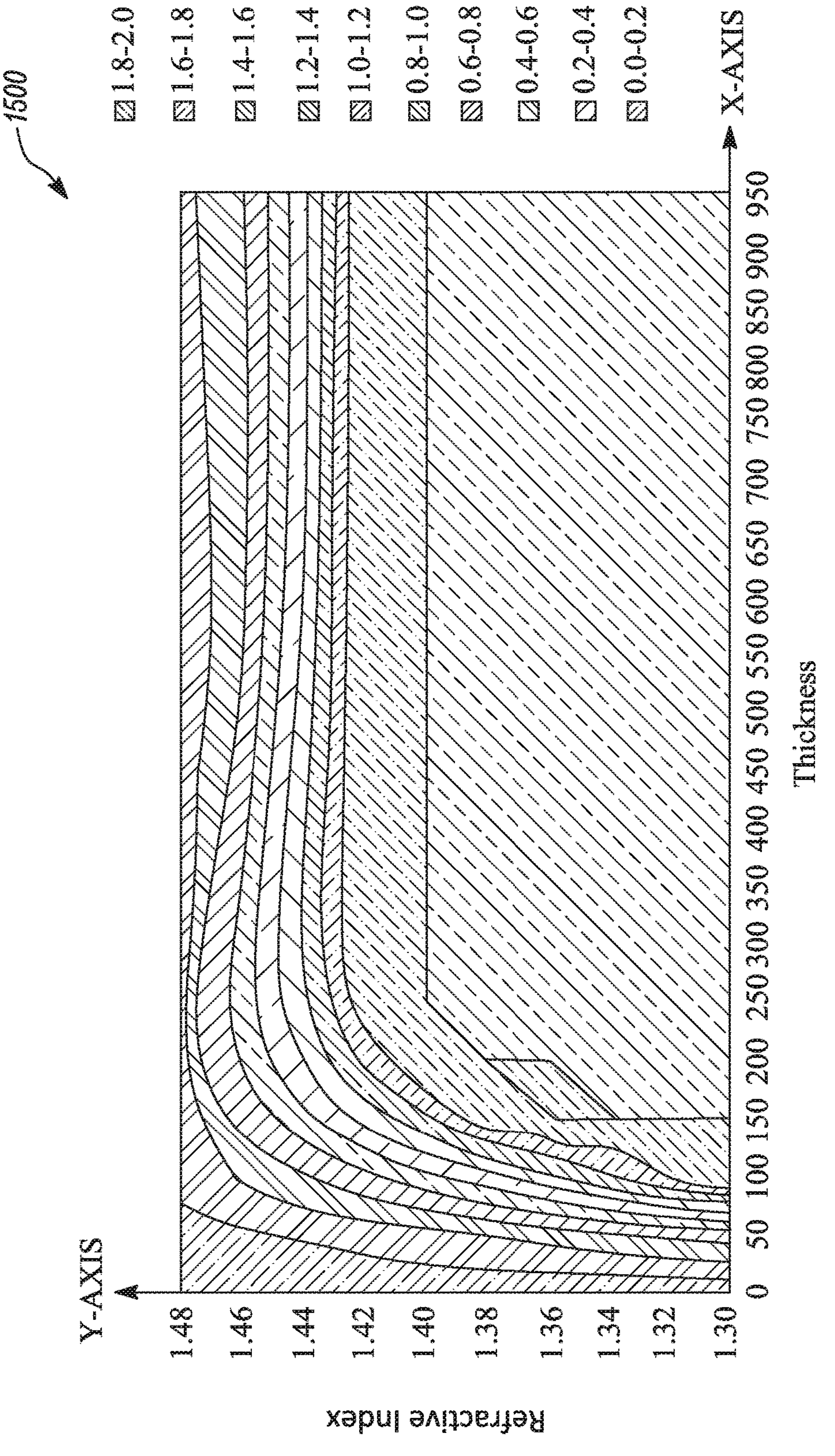
FIG. 15 is an exemplary plot depicting a merit function of the light control film of FIG. 11.

FIG. 15 illustrates an exemplary plot 1500 depicting a merit function of the LCF 1100 for light cut-off angle above 30 degrees. The merit function is defined as a sum of the louver transmission for the polar cut-off viewing angle "θP" ranging from 30 degrees to 90 degrees. More particularly, the merit function is defined by the sum of the louver transmissions for polar cut-off viewing angle "θP" of 31.5 degrees, 34.5 degrees, 37.5 degrees, up to 88.5 degrees with 3 degrees increment (i.e., $T(31.5°)+T(34.5°)+T(37.5°)+ \ldots +T(88.5°)$). The 3 degrees increment was used in the model as angular resolution. Various values for the thickness "TI" in nm of the intermediate index layers 1138, 1140 are marked on the X-axis. Further, various values of the fourth refractive index of the intermediate index layers 1138, 1140 are marked on the Y-axis. The plot 1500 shows that the LCF 1100 provides sufficient light cut-off above 30 degrees for various ranges of the thickness "TI" and fourth refractive index. The actual definition of sufficient may vary based on the application of the LCF 100.

Figure 16:
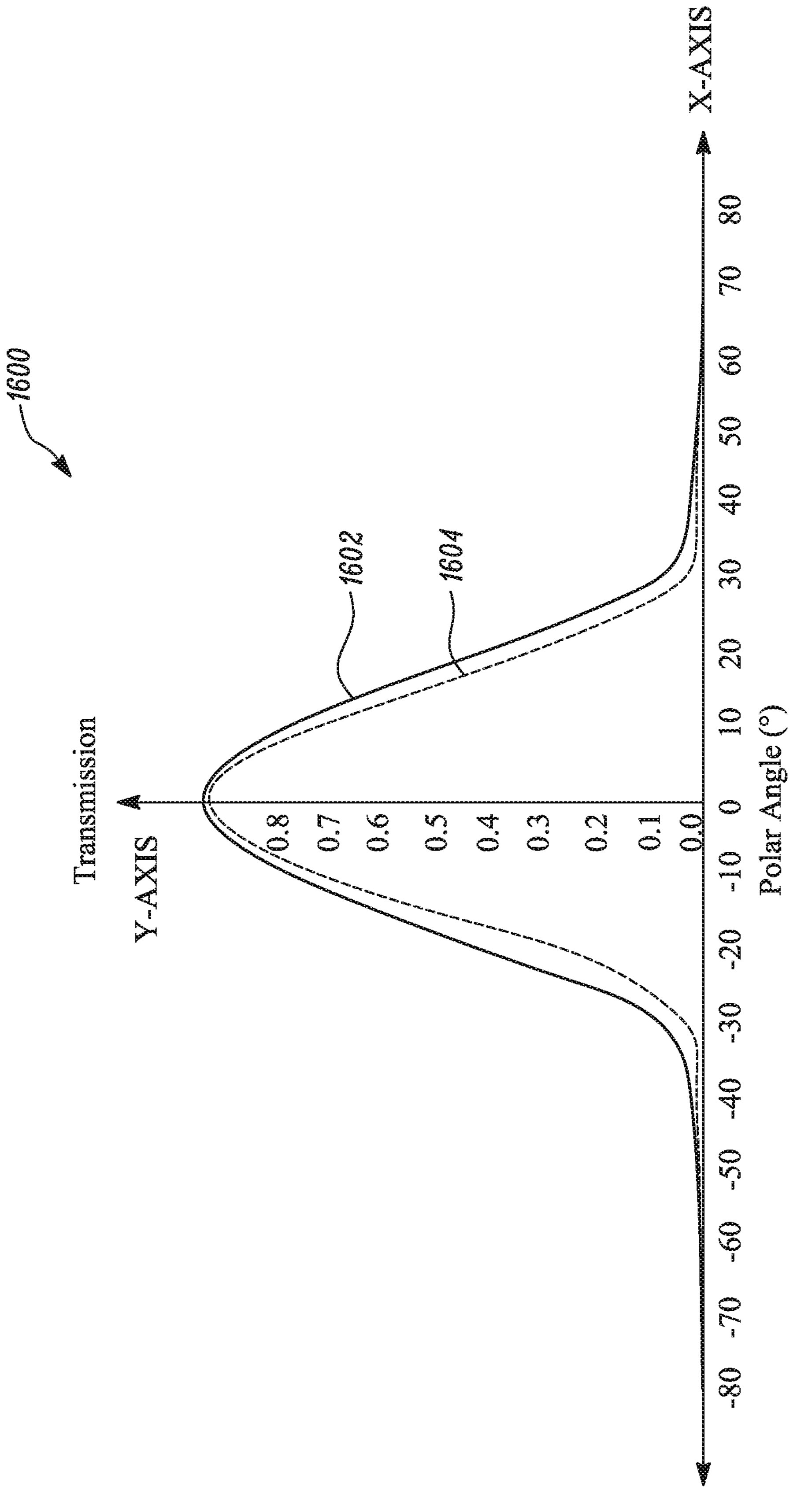
FIG. 16 is an exemplary plot illustrating luminance versus polar cut-off viewing angle of the light control film of FIG. 11.

FIG. 16 illustrates an exemplary plot 1600 for luminance versus polar cut-off viewing angle "θP". Various values for the polar cut-off viewing angle "θP" corresponding to the LCF 1100 are marked on the X-axis. Further, various values for the transmission through the LCF 1100 are marked on the Y-axis. A curve 1602 illustrated on the plot 1600 depicts luminance when the thickness "TI" of the intermediate index layers 1138, 1140 is equal to 100 nm. Further, a curve 1604 illustrated on the plot 1600 depicts luminance when the thickness "TI" of the intermediate index layers 1138, 1140 is equal to 0. From the plot 1600, it may be concluded that the LCF 1100 provides high on-axis transmission while maintaining off-axis light cut-off.

Figure 17:
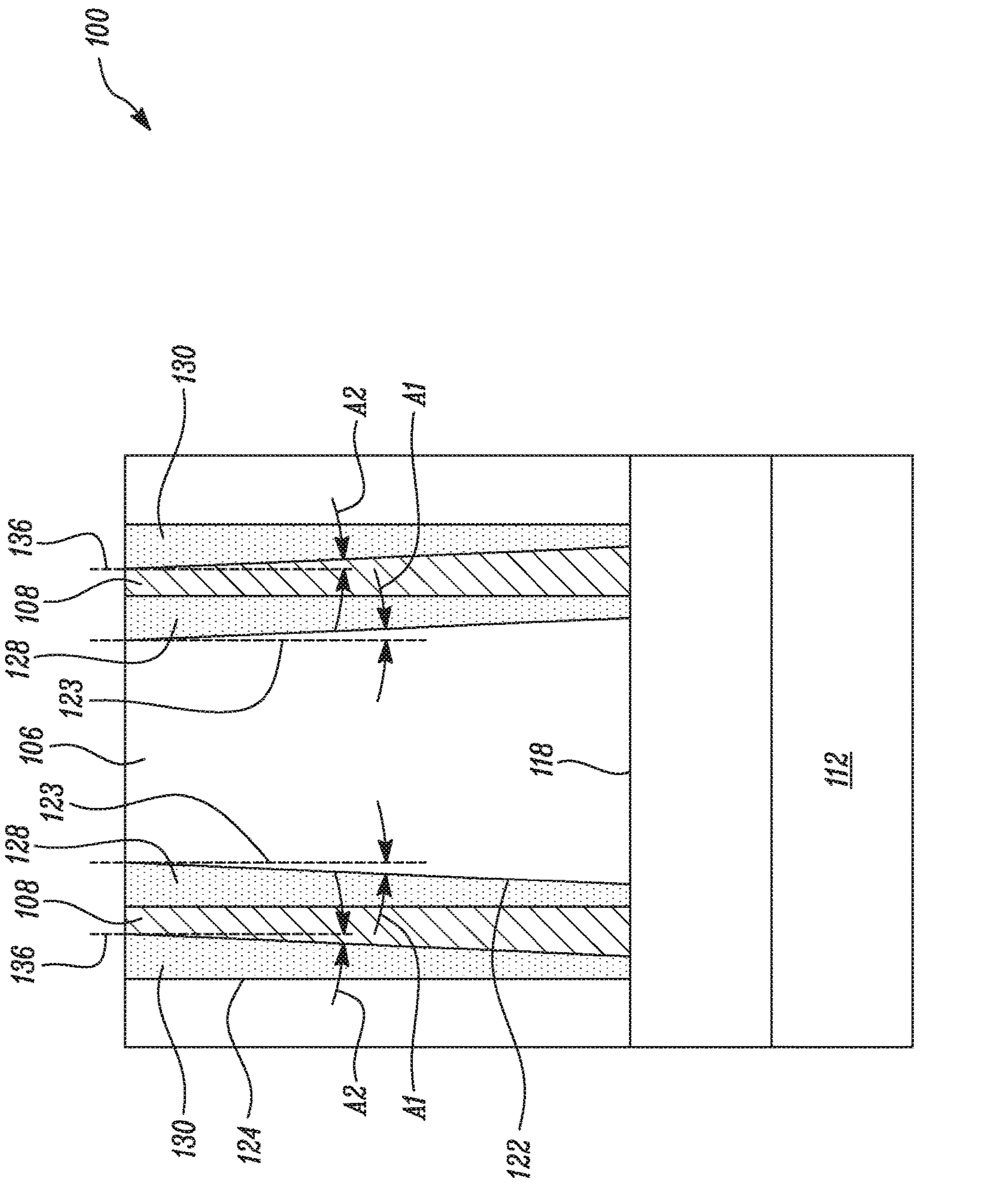
FIG. 17 is a side view of the light control film of FIG. 1 with at least one tapered low index layer.

FIG. 17 illustrates a side view of the light control film 100 of FIG. 1, wherein the side wall 122, 124 of the transmissive regions 106, the low index layers 128, 130, and the absorptive regions 108 are tapered. As illustrated, the second wall angle "A2" is defined between each of the absorptive regions 108 and lines 136. The taper of each of the low index layers 128, 130 may be based on the wall angles "A1", "A2". Further, the low index layers 128, 130 are wedge shaped. In this example, the first and second low index layers 128, 130 includes the thickness "TL" (see FIG. 1) that is greater at a top of the side walls 122, 124 than at a bottom of the side walls 122, 124. More particularly, each low index layer 128, 130 has a non-uniform thickness. An average thickness "TL" of each low index layer 128, 130 decreases progressively from the light output surface 104 (see FIG. 1) to the light input surface 102 (see FIG. 1).

Figure 18:
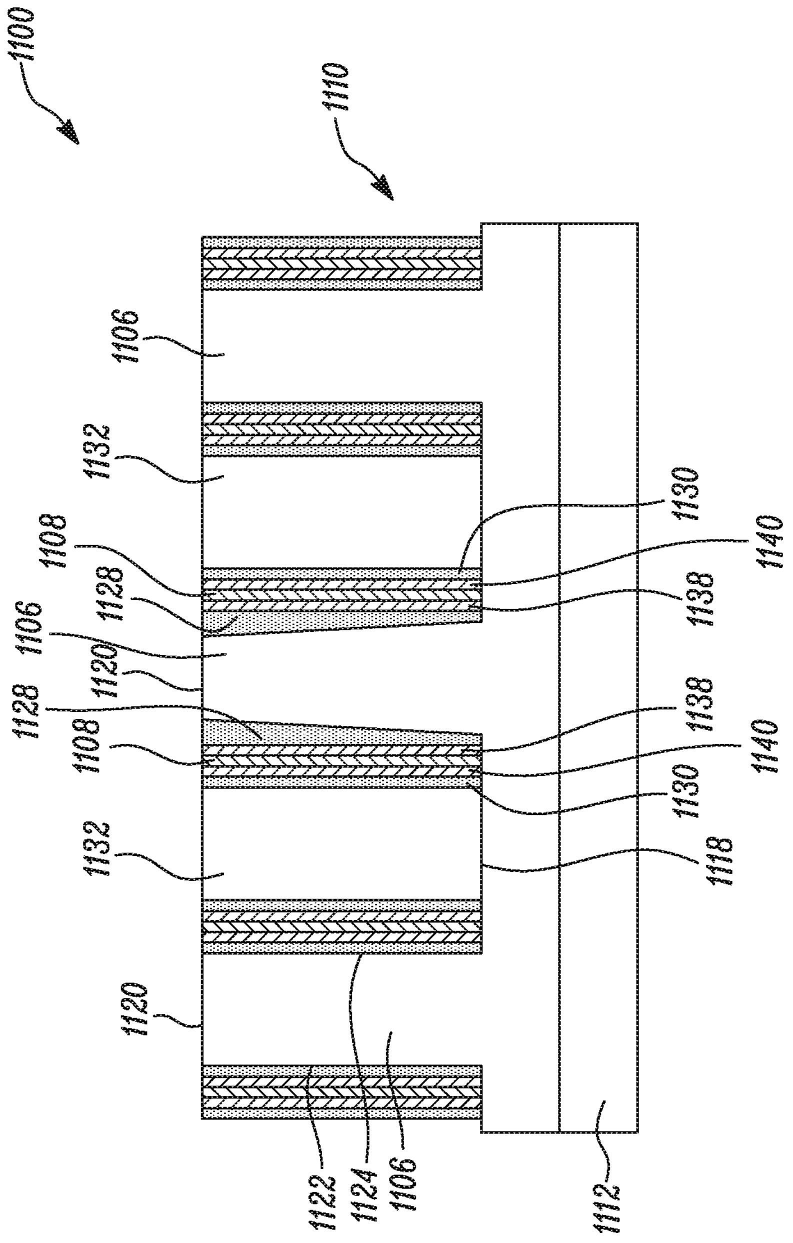
FIG. 18 is a side view of the light control film of FIG. 11 with at least one tapered low index layer.

FIG. 18 is a side view of the light control film 1100 of FIG. 11, wherein the first low index layers 1128 are illustrated as tapered. More particularly, the first low index layers 1128 are tapered based on an inclination of the side wall 1122, 1124 of the transmissive regions 1106. Further, the first low index layers 1128 are wedge shaped. In this example, the first low index layers 1128 define a thickness that is greater at a top of the side walls 1122, 1124 than at a bottom of the side walls 1122, 1124. For exemplary purposes, only two side wall 1122, 1124 of the transmissive regions 1106 and two first low index layers 1128 are shown to be tapered. However, it should be noted that each of the first low index layers 1128 and the second low index layers 1130 may be tapered, without any limitations.

An addition of the low index layers 128, 130, 1128, 1130 creates a condition of TIR when light travelling through the LCF 100, 1100 encounters an interface with the low refractive index material at an angle of incidence "θI" that exceeds a critical angle. However, light arriving at the same interface with an angle of incidence "θI" lesser than the critical angle may transmit through the low refractive index material and into the adjacent high aspect ratio light transmissive regions 106, 1106, thus increasing the sharpness (top hat (d_Transmission/d_angle) of light cut-off as a function of the viewing angle "θP". The LCF 100, 1100 described herein may be used in automotive display applications. Further, the LCF 100, 1100 may be useful as privacy films. The privacy films may permit outside viewing at specific angles and may prevent undesired heating or glare from sunlight. Similarly, the LCFs 100, 1100 may be used as angular control filters for optical sensors.

EXAMPLES

Objects and advantages of this disclosure are further illustrated by the following examples, but the particular materials and amounts thereof recited in these examples, as well as other conditions and details, should not be construed to unduly limit this disclosure.

The disclosure is further described with reference to the following examples that explain the process being applied for providing the low index layers 128, 130 on the side walls 122, 124. The examples will be explained in reference to FIGS. 1 to 7. It should be noted that the examples are equally applicable to provision of the low index layers 1128, 1130.

Unless otherwise noted, all parts, percentages, ratios, etc., in the examples and in the remainder of the specification are by weight. Further, in these examples, the micro-replicated base film 110 was manufactured using Resin A as described in preparative Example 1 of WO Patent No. 2019118589 (Schmidt et al.). Raw materials used in Resin A are given in Table 1 below.

TABLE 1

Raw materials for Resin A

| Material | Abbreviation | Source |
|---|---|---|
| Aliphatic urethane diacrylate Viscosity 5900 MPa · s at 60° C. Tensile Strength 2060 psi Tg = −7° C. | Photomer 6010 | BASF |
| Ethoxylated (10) bisphenol A diacrylate | SR602 | Sartomer (Exton, PA) |
| Ethoxylated (4) bisphenol A diacrylate | SR601 | Sartomer (Exton, PA) |
| Trimethylolpropane triacrylate | TMPTA | Cytec Industries (Woodland Park, NJ) |
| Phenoxyethyl Acrylate | PEA (Etermer 2010) | Eternal Chemical Co., Ltd., Kaohsiung, Taiwan |
| 2-Hydroxy-2-methylpropiophenone photoinitiator | Darocur 1173 | BASF Corporation (Florham Park, New Jersey) |
| Diphenyl(2,4,6-trimethylbenzoyl)phosphine oxide photoinitiator | TPO | BASF Corporation (Florham Park, New Jersey) |
| Irgacure 1035 anti-oxidant | I1035 | BASF Corporation (Florham Park, New Jersey) |

The composition of Resin A is given below.

| Material | Parts by Weight |
|---|---|
| Photomer 6010 | 60 |
| SR602 | 20 |
| SR601 | 4.0 |
| TMPTA | 8.0 |
| PEA (Etermer 2010) | 8.0 |
| Darocur 1173 | 0.35 |
| TPO | 0.10 |
| I1035 | 0.20 |

Example 1

The LCF 100 of this example included a square wave microstructured film 110. The LCF 100 of this example was manufactured on a set-up including a roll to roll vacuum coater similar to the coater described in U.S. Patent Application No. 20100316852 (Condo et al.) to achieve vacuum condensation and polymerization. The vacuum coater was threaded up with an indefinite length roll having a width of 22 inch (55.9 cm) of the square wave microstructured film 110. Among other components, the set-up included an evaporator, a first sputtering station, and a plasma pretreatment station. The set-up further included another evaporator and curing system located between the plasma pretreatment station and the first sputtering system. Moreover, the set-up included evaporators as described in U.S. Pat. No. 8,658,248 (Anderson and Ramos).

Further, a first acrylate layer of tricyclodecane dimethanol diacrylate (obtained under the trade designation SARTOMER SR833S from Sartomer USA, Exton, PA) was applied to a release layer by ultrasonic atomization and flash evaporation to provide the first low index layer 128. Further, a flow rate of liquid monomer into the evaporator was 3 mL/minute. A nitrogen gas flow rate was 100 standard cubic centimeters per minute (sccm) and the evaporator temperature was set at 500° F. (260° C.). The process drum temperature was 14° F. (−10° C.). The monomeric first low index layer 128 was subsequently cured immediately downstream with an electron beam curing gun operating at 7.0 kV and 10.0 mA. This process resulted in the acrylic, first low index layer 128 having a thickness "TL" of 1580 nm proximate to the top surface 120 of the square wave microstructured film 110, 500 nm on portions of the side walls 122, 124 that were nearest to the top surface 120 of the microstructured film 110, 90 nm on portions of the side walls 122, 124 that were nearest to the bottom surface 118, and 450 nm in thickness on the bottom surface 118 of the square wave microstructured film 110 as measured by scanning electron microscopy.

Example 2

TABLE 2

Raw materials for Plasma Enhanced Chemical Vapor Deposition (PECVD) Process

| Material | Abbreviation | Source |
|---|---|---|
| Hexamethyldisiloxane | HMDSO | Gelest Inc (Morrisville, Pennsylvania) |
| Oxygen (UHP compressed gas) | $O_2$ | Oxygen Service Company (St Paul, Minnesota) |

In this example, the low index layer 128 was provided using the PECVD process. A set-up for conducting the PECVD process was similar to the set-up described in U.S. Pat. No. 8,460,568. The PEVCD process was performed in a home-built parallel plate capacitively coupled plasma reactor. The chamber had a central cylindrical powered electrode with a surface area of 18.3 sq. ft. After placing the microstructured film 110 on the powered electrode, the reactor chamber was pumped down to a base pressure of less than 1.3 Pa (2 mTorr). A mixture of HMDSO (hexamethyldisiloxane) and O2 (oxygen) gas was flown into the chamber, at flow rates of 200 SCCM and 1000 SCCM, respectively.

Further, the treatment was carried out by coupling Radio Frequency (RF) power into the reactor chamber at a frequency of 13.56 MHz and an applied power of 9000 watts. The treatment time was controlled by moving the microstructured film 110 through the reaction zone at a rate of 1 ft/min. Following the treatment, the RF power and the gas supply were stopped and the reactor chamber was returned to atmospheric pressure.

This resulted in SiCOx coatings with thickness 500 nm on the top surface 120 of the microstructured film 110, 145 nm on portions of the side walls 122, 124 nearest to the top surface 120 of the microstructured film 110, 100 nm on portions of the side walls 122, 124 at a middle of the microstructured film 110, 55 nm on portions of the side walls 122, 124 nearest to the bottom surface 118 of the microstructured film 110, and 250 nm on the bottom surface 118 of the microstructured film 110.

FIG. 19 is a flowchart for a method 1900 of making the LCF 100. However, the method 1900 is equally applicable to making the LCF 1100. At step 1902, the microstructured film 110 comprising the plurality of light transmissive regions 106 alternated with the channels 116 is provided, wherein the microstructured film 110 has the surface 117 defined by the top surface 120 and the side walls 122, 124 of each light transmissive region 106 and the bottom surface 118 of each channel 116, wherein the microstructured film 110 has the first refractive index. At step 1904, the layer 128, 130 of the low refractive index material is applied to the surface 117, wherein the low refractive index material has a second refractive index less than the first refractive index of the microstructured film 110. The layer 128, 130 of the low refractive index material is applied by at least one of sputtering, plasma enhanced chemical vapor deposition, vacuum condensation and polymerization, and layer-by-layer assembly. At step 1906, the layer 126 of the light absorptive material is applied on the layer 128 of the low refractive index material. The layer 126 of the light absorptive material has the aspect ratio of at least 30.

At step 1908, at least a portion of the layer 128 of the low refractive index material and the layer 126 of the light absorptive material is removed from the top surface 120 of each light transmissive region 106 and the bottom surface 118 of each channel 116. Moreover, the channels 116 are filled with the material 132 similar to the material of the microstructured film 110. Further, in some embodiments, the layer 1138, 1140 of the intermediate refractive index material is applied between the layer 1128, 1130 of the low refractive index material and the layer 1126 of the light absorptive material, wherein the intermediate refractive index material has the fourth refractive index greater than the second refractive index of the low refractive index material. Further, at least a portion of the layer 1138, 1140 of the intermediate refractive index material is removed from the top surface 1120 of each light transmissive region 1106 and the bottom surface 1118 of each channel 1116.

Modelled Examples

The performance of the proposed approach is simulated with LightTools model of the square wave microstructured film as shown schematically in FIG. 8, vertical sidewalls are coated with a 3-layer stack including a first low index clear layer, a core layer and a second low index clear layer. The aspect ratio of the structure is explored as variable by (3) different structure aspect ratios: 3:1, 6:1 and 9:1. For each of these aspect ratios, the low index clear layer conditions were variable from n=1.30 to 1.48 and thickness from 0 to 950 nm to show ranges useful for the light control film. In general, the higher structure aspect ratios allow broader ranges of optical film conditions to obtain desired top hat performance. The core layer for these examples was modeled as having n=1.80 and k=0.33 with thickness of 335 nm.

The degree of cutoff is measured by L35, the louver transmission at 35 degree view angle. L35 is defined as the ratio of luminance with the louver to the luminance without the louver at 35 degree viewing angle.

The degree of top hat shape is measured by L20/L0, where L20/L0 is defined as the Ratio of louver transmission at 20 degree viewing angle to louver transmission at 0 degree viewing angle.

| Example | Structure aspect ratio | Index of clear layers | Thickness of clear layers (nm) | L20/ L0 | L35 | Index of clear channel film |
|---|---|---|---|---|---|---|
| 1 | 3:1 | 1.46 | 750 | 0.97 | 0.20 | 1.52 |
| 2 | 6:1 | 1.46 | 750 | 0.95 | 0.05 | 1.52 |
| 3 | 9:1 | 1.46 | 750 | 0.93 | 0.01 | 1.52 |
| 4 | 9:1 | 1.44 | 950 | 0.99 | 0.08 | 1.52 |
| 5 | 9:1 | 1.42 | 950 | 0.99 | 0.42 | 1.52 |

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A light control film comprising:

a light input surface and a light output surface opposite the light input surface;

alternating transmissive regions and absorptive regions disposed between the light input surface and the light output surface, wherein each absorptive region has an aspect ratio of at least 30, and wherein each transmissive region has a first refractive index; and a plurality of low index layers, wherein each low index layer is disposed between each transmissive region and an adjacent absorptive region, and wherein each low index layer has a second refractive index less than the first refractive index of each transmissive region;

wherein each low index layer provided on each side wall of a transmissive region is wedge-shaped with a thickness that is greater adjacent the light output surface than adjacent the light input surface.

2. The light control film of claim 1, wherein a ratio between the first refractive index and the second refractive index is from about 1.01 to about 1.50.

3. The light control film of claim 2, wherein a ratio between the first refractive index and the second refractive index is from about 1.02 to about 1.20.

4. The light control film of claim 1, wherein an average thickness of each low index layer is from about 50 nm to about 950 nm.

5. The light control film of claim 4, wherein an average thickness of each low index layer is from about 150 nm to about 950 nm.

6. The light control film of claim 1, wherein each low index layer comprises at least one of a metal, a resin, a metal oxide, a silicon based material, an air encapsulated coating, and a fluorine based material.

7. The light control film of claim 1, wherein an extinction coefficient of each low index layer is from about 0 to about 0.08.

8. The light control film of claim 1, wherein each absorptive region has a third refractive index greater than the second refractive index.

9. The light control film of claim 8, wherein the third refractive index of each absorptive region is from about 1.5 to about 2.0.

10. The light control film of claim 1, wherein an extinction coefficient of each absorptive region is from about 0.2 to about 0.5.

11. The light control film of claim 1, wherein a thickness of each absorptive region is from about 100 nm to about 1500 nm.

12. The light control film of claim 1, wherein the first refractive index is from about 1.20 to about 1.8.

13. The light control film of claim 1, further comprising an intermediate index layer disposed between each low index layer and an adjacent absorptive region, wherein each intermediate index layer has a fourth refractive index greater than the second refractive index of each low index layer.

14. The light control film of claim 13, wherein the fourth refractive index is greater than the first refractive index of each transmissive region.

15. The light control film of claim 13, wherein the fourth refractive index is from about 1.2 to about 1.8.

16. The light control film of claim 13, wherein an extinction coefficient of each intermediate index layer is from about 0.005 to about 0.08.

17. The light control film of claim 13, wherein each intermediate index layer comprises at least one of a metal, a resin, a metal oxide, a silicon based material, and a fluorine based material.

18. The light control film of claim 1, wherein each low index layer has a non-uniform thickness.

19. A light control film comprising:

a light input surface and a light output surface opposite the light input surface;

alternating transmissive regions and absorptive regions disposed between the light input surface and the light output surface, wherein each absorptive region has an aspect ratio of at least 30, wherein each transmissive region has a first refractive index;

a plurality of low index layers, wherein each low index layer is disposed between each transmissive region and an adjacent absorptive region, and wherein each low index layer has a second refractive index less than the first refractive index of each transmissive region, wherein each low index layer provided on each side wall of a transmissive region is wedge-shaped with a thickness that is greater adjacent the light output surface than adjacent the light input surface; and a plurality of intermediate index layers, wherein each intermediate index layer is disposed between each low index layer and an adjacent absorptive region, wherein each intermediate index layer has a fourth refractive index greater than the second refractive index of each low index layer.

* * * * *